(12) United States Patent
Nikolich et al.

(10) Patent No.: US 6,826,195 B1
(45) Date of Patent: Nov. 30, 2004

(54) SYSTEM AND PROCESS FOR HIGH-AVAILABILITY, DIRECT, FLEXIBLE AND SCALABLE SWITCHING OF DATA PACKETS IN BROADBAND NETWORKS

(75) Inventors: Paul E. Nikolich, Lynnfield, MA (US); Kumar Chinnaswamy, Westminster, MA (US); Paul H. Dormitzer, Acton, MA (US); Willem A. H. Engelse, Schiedam (NL); Walter G. Mahla, Wrentham, MA (US); Howard Ngai, Southboro, MA (US); David R. Paolino, North Andover, MA (US); Kirk B. Pearce, Concord, MA (US); Jyotirmoy B. Sarkar, Westford, MA (US)

(73) Assignee: BigBand Networks BAS, Inc., Westborough, MA (US)

( * ) Notice: Subject to any disclaimer, the term of this patent is extended or adjusted under 35 U.S.C. 154(b) by 0 days.

(21) Appl. No.: 09/474,039

(22) Filed: Dec. 28, 1999

(51) Int. Cl.⁷ .................................................. H04J 3/22
(52) U.S. Cl. ...................................... 370/465; 370/400
(58) Field of Search ................................ 370/352, 353, 370/400, 401, 402, 403, 411, 463, 465, 466, 376, 539, 364, 406, 389, 438, 462, 404, 443, 459, 220, 490; 709/201, 202, 203, 208

(56) References Cited

U.S. PATENT DOCUMENTS

| | | | |
|---|---|---|---|
| 5,416,776 A | * | 5/1995 | Panzarella et al. .......... 370/401 |
| 5,428,806 A | | 6/1995 | Pocrass |
| 5,485,455 A | | 1/1996 | Dobbins et al. |
| 5,594,726 A | | 1/1997 | Thompson et al. |
| 5,615,211 A | | 3/1997 | Santore et al. |
| 5,631,846 A | | 5/1997 | Szurkowski |
| 5,751,710 A | | 5/1998 | Crowther et al. |
| 5,809,021 A | * | 9/1998 | Diaz et al. ................... 370/364 |
| 5,812,771 A | | 9/1998 | Fee et al. |
| 5,848,065 A | | 12/1998 | Gorshe et al. |
| 5,875,309 A | | 2/1999 | Itkowsky et al. |
| 5,885,213 A | | 3/1999 | Richardson et al. |
| 5,943,604 A | | 8/1999 | Chen et al. |
| 5,951,649 A | | 9/1999 | Dobbins et al. |
| 5,971,804 A | | 10/1999 | Gallagher et al. |
| 5,987,069 A | | 11/1999 | Furukawa et al. |
| 6,014,380 A | | 1/2000 | Hendel et al. |
| 6,023,148 A | | 2/2000 | Pignolet |
| 6,031,843 A | | 2/2000 | Swanbery et al. |
| 6,151,628 A | | 11/2000 | Xu et al. |
| 6,154,465 A | * | 11/2000 | Pickett ....................... 370/466 |
| 6,289,405 B1 | | 9/2001 | Movall et al. |
| 6,385,573 B1 | | 5/2002 | Gao et al. |
| 6,385,773 B1 | | 5/2002 | Schwartzman et al. |
| 6,415,314 B1 | | 7/2002 | Fee et al. |
| 6,459,700 B1 | | 10/2002 | Hoang |
| 6,553,568 B1 | | 4/2003 | Fijolek et al. |
| 6,570,913 B1 | | 5/2003 | Chen |
| 6,594,305 B1 | | 7/2003 | Roeck et al. |
| 6,704,288 B1 | | 3/2004 | Dziekan et al. |

FOREIGN PATENT DOCUMENTS

| | | |
|---|---|---|
| EP | 0 844 763 A2 | 5/1998 |
| EP | 0 911 962 A1 | 4/1999 |
| EP | 0 949 832 A1 | 10/1999 |
| WO | WO 99/53652 | 10/1999 |

* cited by examiner

Primary Examiner—Dang Ton
Assistant Examiner—Phuc Tran
(74) Attorney, Agent, or Firm—Fogg and Associates, LLC; Laura A. Ryan

(57) ABSTRACT

A system and process for directly and flexibly switching connections of data packet flows between nodes of a broadband data processing system network. The system acts as a single IP switch.

30 Claims, 21 Drawing Sheets

| IP Address | MAC Address |
|---|---|
|  |  |

FIG. 15

SYSTEM AND PROCESS FOR HIGH-AVAILABILITY, DIRECT, FLEXIBLE AND SCALABLE SWITCHING OF DATA PACKETS IN BROADBAND NETWORKS

BACKGROUND OF THE INVENTION

The field of the invention is that of communication over a broadband network of data processing systems, for example, a network using a SONET backbone and Hybrid Fiber-Coax(ial cable) ("HFC") access network to connect users to the backbone. A packet communications standard for the HFC environment is DOCSIS (Data Over Cable Service Interface Specification, Document No. SP-RFI-I05-991105) of CableLabs.

FIG. 1 shows a typical configuration of wide-area delivery of data to HFC systems (each connected to 200–2000 households passed (HHP)). The head-end termination system 2 is connected to a SONET ring 4 via a multiplexer drop on the ring 6. The head-end 2 is connected to a fiber node 9 by a fiber downstream connection 7 and a fiber upstream connection 8. The fiber node 9 has coax connectors 10 out to cable modem subscribers (i.e. homes 11). These multiplexers currently cost some $50,000 in addition to the head-end termination system, and scaling up of service to a community may require new multiplexers and servers. The failure of a component on the head-end termination system can take an entire "downstream" (from the head-end to the end-user) sub-network (FIG. 7) out of communication with the attached networks.

Attempts have been made to integrate systems in order to reduce costs and to ease system management. A current "integrated" data delivery system 20 is shown as functional blocks in FIG. 2. FIG. 2 shows a system 20 having a reverse path monitoring system 22, an IP switch 24, a router 26., modulators and up-converters 28, a provisioning system 30, telephony parts 32, and a plurality of CMTS's 34 (cable modem termination systems). This type of system typically is constructed with multiple systems from multiple vendors, has different management systems, a large footprint, high power requirements and high operating costs.

A typical current network broadband cable network for delivery of voice and data is shown in FIG. 3. Two OC-12 packet over SONET (POS) links 40, 42 are each connected to one of two backbone routers 44, 46 which are in turn networked to two switches 48, 50. The switches 48, 50 are networked to CMTS head-end routers 52, 54. The CMTS head-end routers 52, 54 are connected to a plurality of optical nodes 56 through a CMTS 61. The switches 48, 50 are also connected to a plurality of telephone trunk gateways 58 which are in turn connected to the public switched telephone network (PSTN) 60. As with the "integrated" system shown in FIG. 2, this type of network also typically has multiple vendors for its multiple systems, has different management systems, a large footprint, high power requirements and high operating costs. It remains desirable to have a truly integrated solution to reduce the size of the system, its power needs, and its costs, as well as to ensure greater consistency and increased reliability in data delivery.

It is an object of the present invention to provide an integrated system and a process for broadband delivery of high quality voice, data, and video services.

It is another object of the present invention to provide a system and process for a cable-access platform having high network reliability with the ability to reliably support lifeline telephony services and the ability to supply tiered voice and data services.

It is another object of the present invention to provide a system and process for a secure and scalable network switch.

SUMMARY OF THE INVENTION

The problems of providing an integrated network solution for data processing in a broadband network environment are solved by the present invention of a highly integrated carrier-class broadband access system for delivering high quality voice, data and video services.

In the present invention, a process and system are provided in which switching to the HFC conduits is performed in the IP (Internet Protocol) or Network Layer (OSI Layer 3) using combinations of Wide Area Network (WAN) interface cards, HFC interface (Cable Modem Termination) cards, and inter-chassis link (ICL) cards in a fully meshed common chassis, controlled by a cluster manager. The ICLs may stretch over several miles, but the cluster of chassises, controlled by the cluster manager, acts as a single IP switch. The chassis can interface with other broadband access media as well, for example Digital Subscriber Line (DSL), fixed wireless Local Multi-point Distribution Service (LMDS) and Multi-channel Multi-point Distribution Service (MMDS), as well as "fiber to the curb" (FTTC).

The invention offers the flexibility of deploying a variety of local and wide-area configurations, making it suitable for smaller operators requiring a ready path for scaling up. Different media cards may be used for different modes of broadband communication, such as one-way cable with telephone modem return. The invention also allows several levels-of redundancy for different network elements, allowing an operator to provide higher availability by having redundancy of particularly stressed elements. The invention supports tiered voice and data systems. The invention provides a reliable, scalable system with a small footprint and low power requirements.

The present invention together with the above and other advantages may best be understood from the following detailed description of the embodiments of the invention illustrated in the drawings, wherein:

DESCRIPTION OF THE DRAWINGS

FIG. 15 is a block diagram of an ARP table;

DETAILED DESCRIPTION

Figure 1:
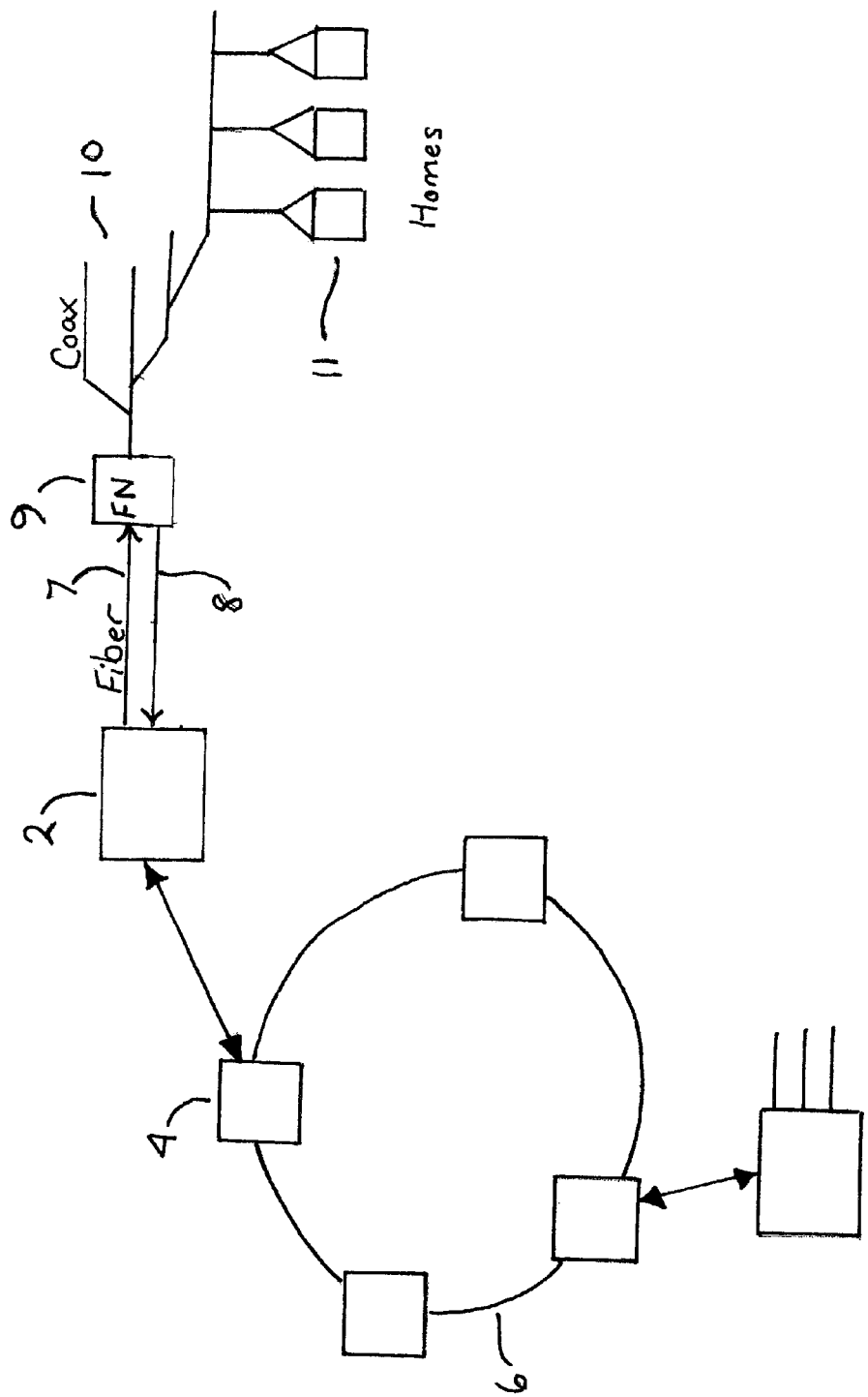
FIG. 1 shows a prior art network having an HFC head-end server connected to a SONET ring through a multiplexer drop.
Figure 2:
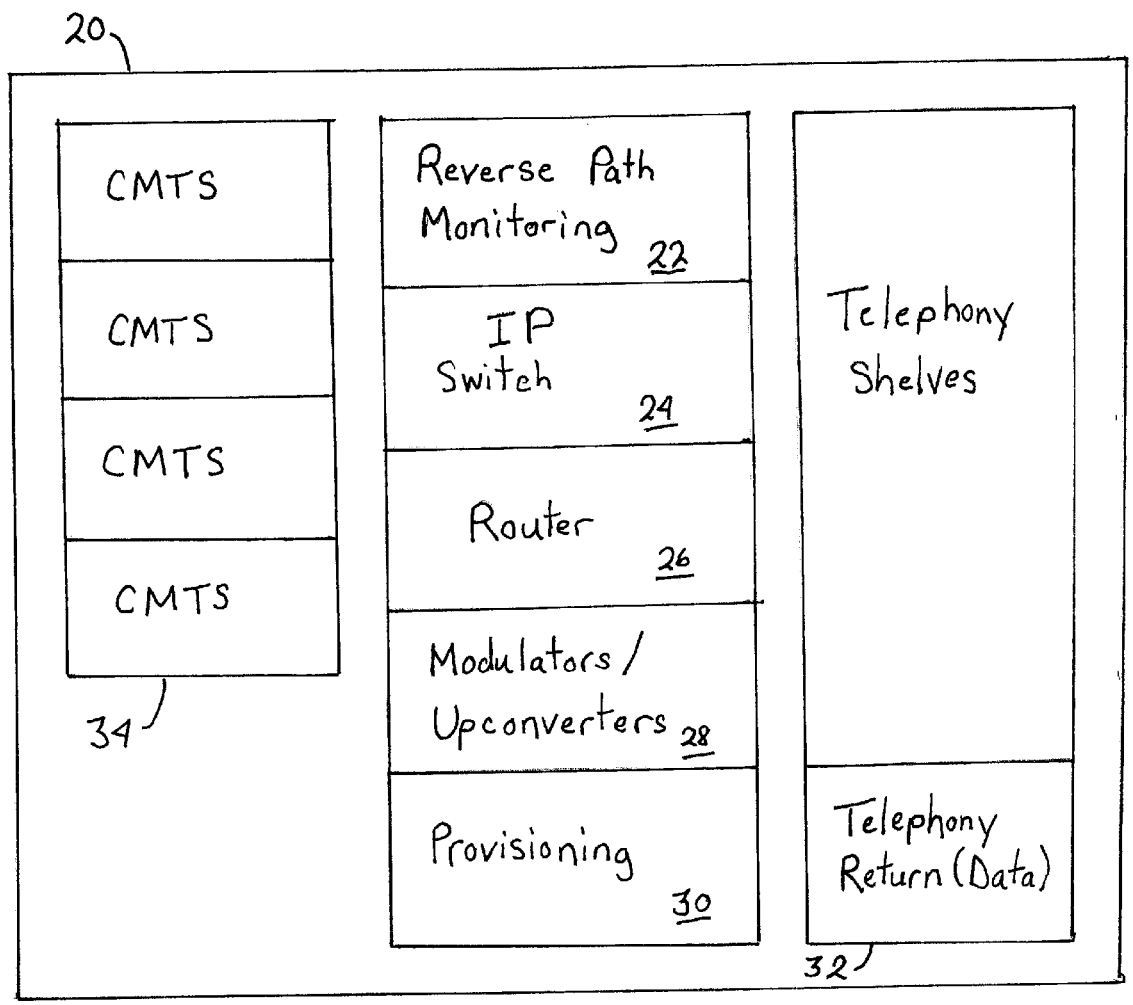
FIG. 2 shows a prior art HFC data over cable delivery system.
Figure 3:
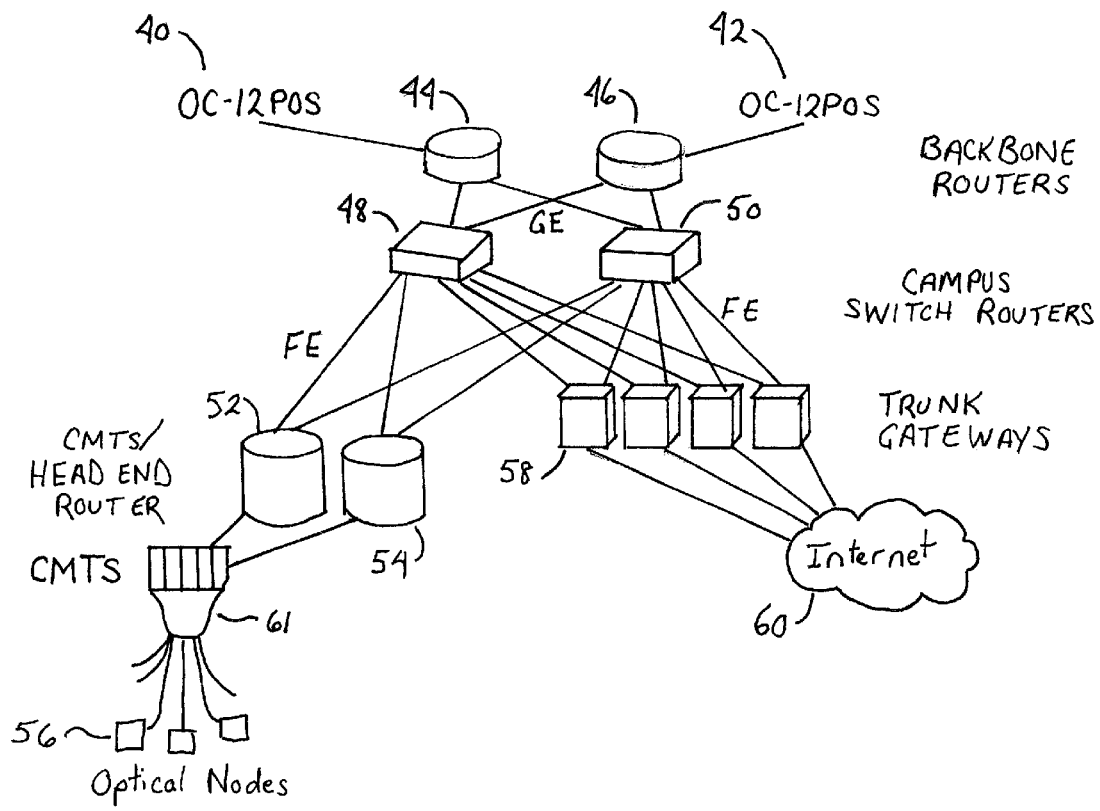
FIG. 3 shows a prior art data delivery network.
Figure 4:
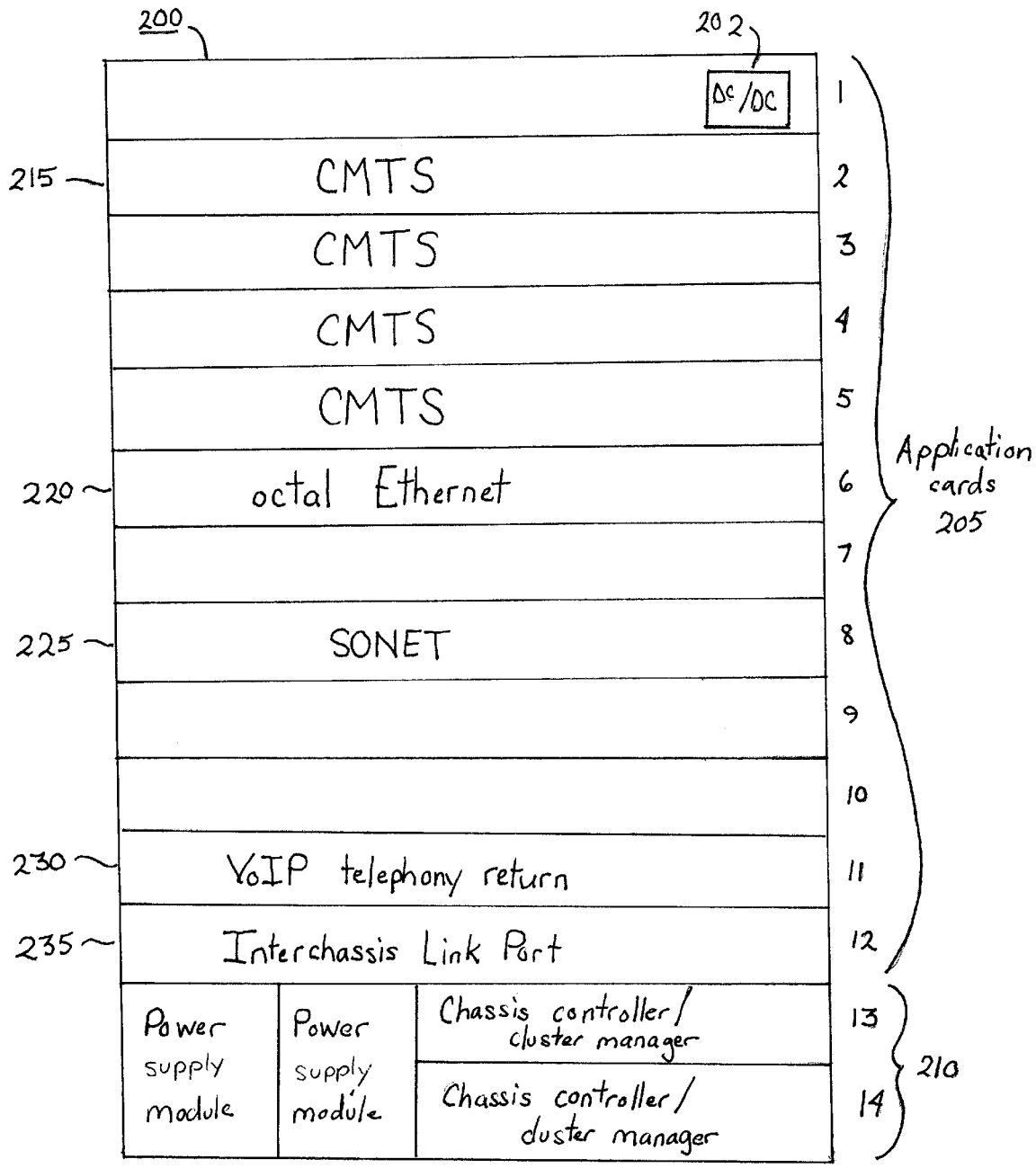
FIG. 4 is a block diagram of a chassis according to principles of the invention.

FIG. 4 shows a chassis 200 operating according to principles of the present invention. The chassis 200 integrates a plurality of network interfaces and applications into a single switch system. The chassis of the invention is a fully-meshed IP-switch with high performance packet forwarding, filtering and QoS/CoS (Quality of Service/Class of Service) capabilities using low-level embedded software controlled by a cluster manager in a chassis controller. The packet forwarding, filtering and QoS/CoS is distributed across application modules (also called "cards") inside the chassis. The operations are performed in each of the modules by a fast IP processor. The chassis controller and cluster manager control the operation and configure each of the modules. Higher-level software resides in the cluster manager, including router server functions (RIPvl, RIPv2, OSPF, etc.), network management (SNMP V1/V2), security, DHCP, LDAP, and remote access software (VPNs, PPTP, L2TP, and PPP), and can be readily modified or upgraded.

In the present embodiment of the invention, the chassis 200 has fourteen (14) slots for modules. Twelve of those fourteen slots hold application modules 205, and two slots hold chassis controller modules 210. Each application module has an on-board DC-DC converter 202 and is "hot-pluggable" into the chassis. The chassis controller modules 210 are for redundant system clock/bus arbitration. The chassis also has redundant power supply modules. The power supply modules and the DC-DC converters comprise a fully distributed power supply in the chassis. Examples of applications that may be integrated in the chassis are a CMTS module 215, an Ethernet module 220, a SONET module 225, and a telephony application 230. Another application may be an inter-chassis link (ICL) port 235 through which the chassis may be linked to another chassis. The ICL port is the only egress port. The ICL port may be implemented using any egress module, e.g., 10/100 Ethernet, IG Ethernet, and Packet-over-SONET (PoS).

Figure 5:
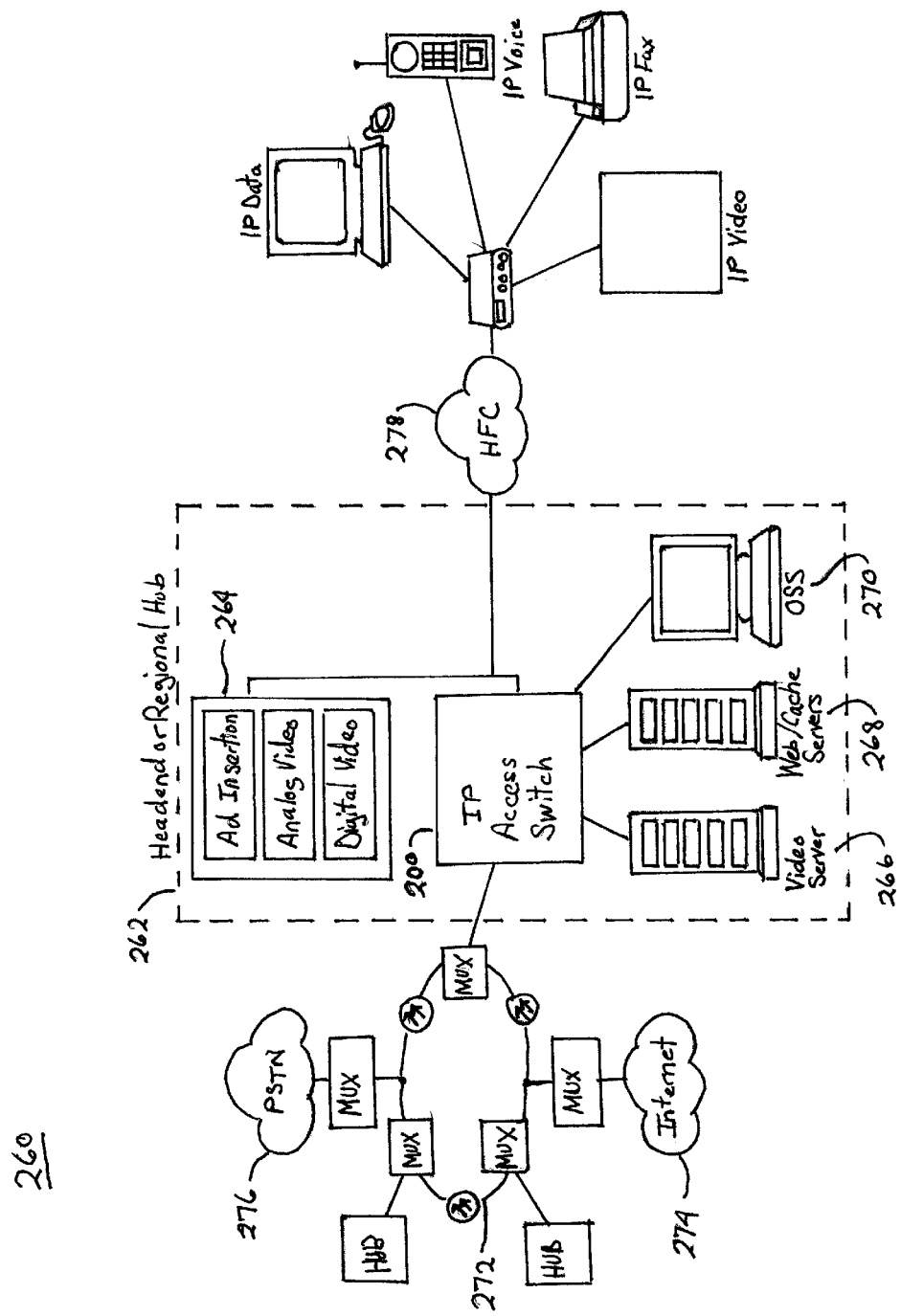
FIG. 5 shows an integrated cable infrastructure having the chassis of FIG. 4.

FIG. 5 shows an integrated cable infrastructure 260 having the chassis 200 of FIG. 4. The chassis 200 is part of a regional hub 262 for voice and data delivery. The hub 262 includes a video controller application 264, a video server 266, Web/cache servers 268, and an operation support system (OSS) 270, all networked to the chassis 200 acting as an IP access switch. The chassis 200 is connected to a SONET ring 272, outside the hub 262, having an Internet connection 274 and a Public Switched Telephone Network (PSTN) connection 276. The chassis 200 is also connected by an HFC link 278 to cable customers and provides IP-based services including voice, data, video and fax services. Each HFC application module can handle up to 2000 cable modem service subscribers. The logical limit to the number of subscribers is 8192. The chassis can support a plurality of HFC links and also a plurality of chassises may be networked together (as described below) to support over one million cable modem subscribers.

By convention today, there is one wide-band channel (27–40 Mbps) for transmission (downloading) to users (which may be desktop computers, facsimile machines or telephone sets) and a plurality of narrower channels (320 Kbps–10 Mbps) for uploading. This is processed by the HFC cards with duplexing at an O/E node. The local HFC cable system or loop is a coaxial cable distribution network with a drop to a cable modem.

Figure 6:
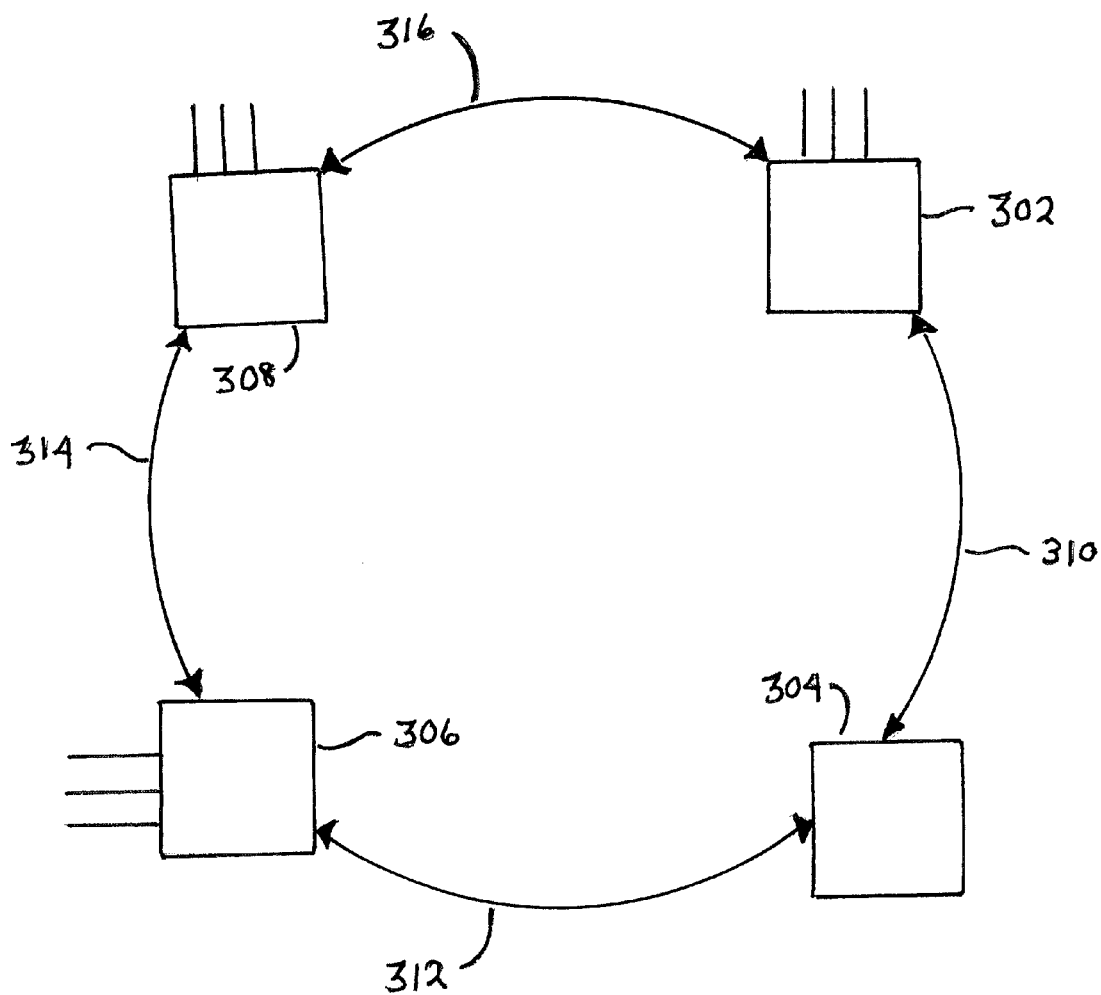
FIG. 6 shows a network using a plurality of chassises, such as the one of FIG. 4, in a ring topology.

FIG. 6 shows a ring network 300 using a plurality of chassises of FIG. 4. The plurality of chassises 302, 304, 306, 308 are connected as a ring over full-duplex inter chassis links 310, 312, 314, 316. The ring configuration allows chassis 302 and its associated cable networks to communicate with chassis 306 and its associated cable networks through chassis 308 should chassis 304 or the ICLs 310, 312 between them fail.

Figure 7:
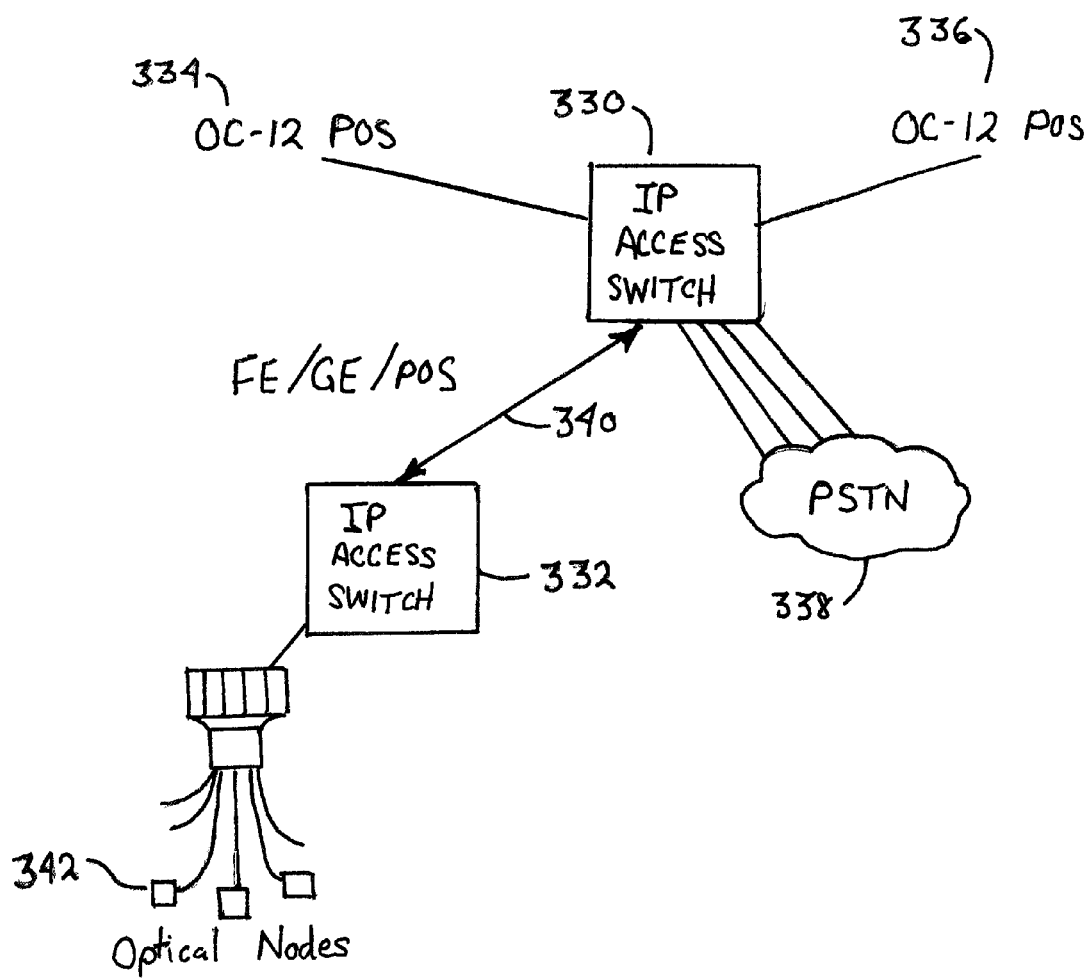
FIG. 7 shows a first hierarchical network having a primary chassis and a secondary chassis operating according to principles of the present invention.

FIG. 7 shows a first hierarchical network 328 having a primary chassis 330 and a secondary chassis 332 operating according to principles of the present invention. The primary chassis is connected to fiber optic communication lines (OC-n) 334, 336. OC-12 lines are shown in the drawing, however OC-3 and OC-48 are also supported. The primary chassis 330 may also be connected to the PSTN 338. The primary 330 and secondary 332 chassises are linked by a full-duplex link 340 that may be a Fast Ethernet (FE), Gigabit Ethernet, or a Packet-over-SONET (PoS) type connection. The secondary chassis 332 is connected to a plurality of optical nodes 342. In networks where there is a primary chassis and one or more secondary chassises, the primary chassis manages the cluster with its cluster manager.

Figure 8:
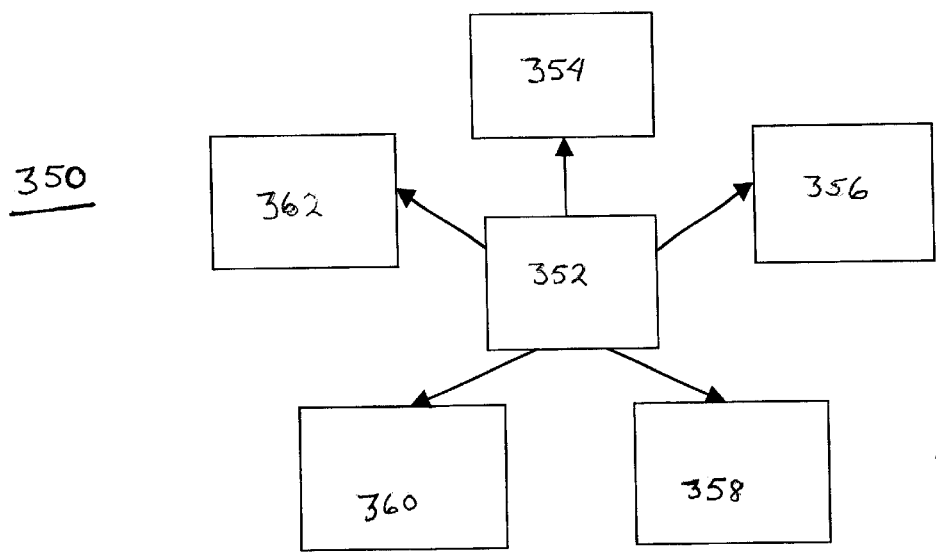
FIG. 8 shows a star network having a plurality of chassises such as the one of FIG. 4.
Figure 9:
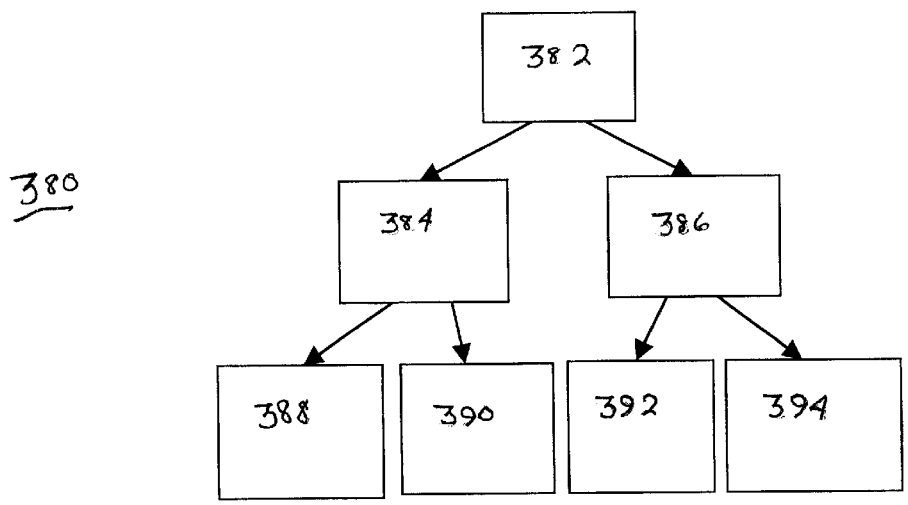
FIG. 9 shows a second hierarchical network having a plurality of chassises such as the one of FIG. 4.
Figure 10:
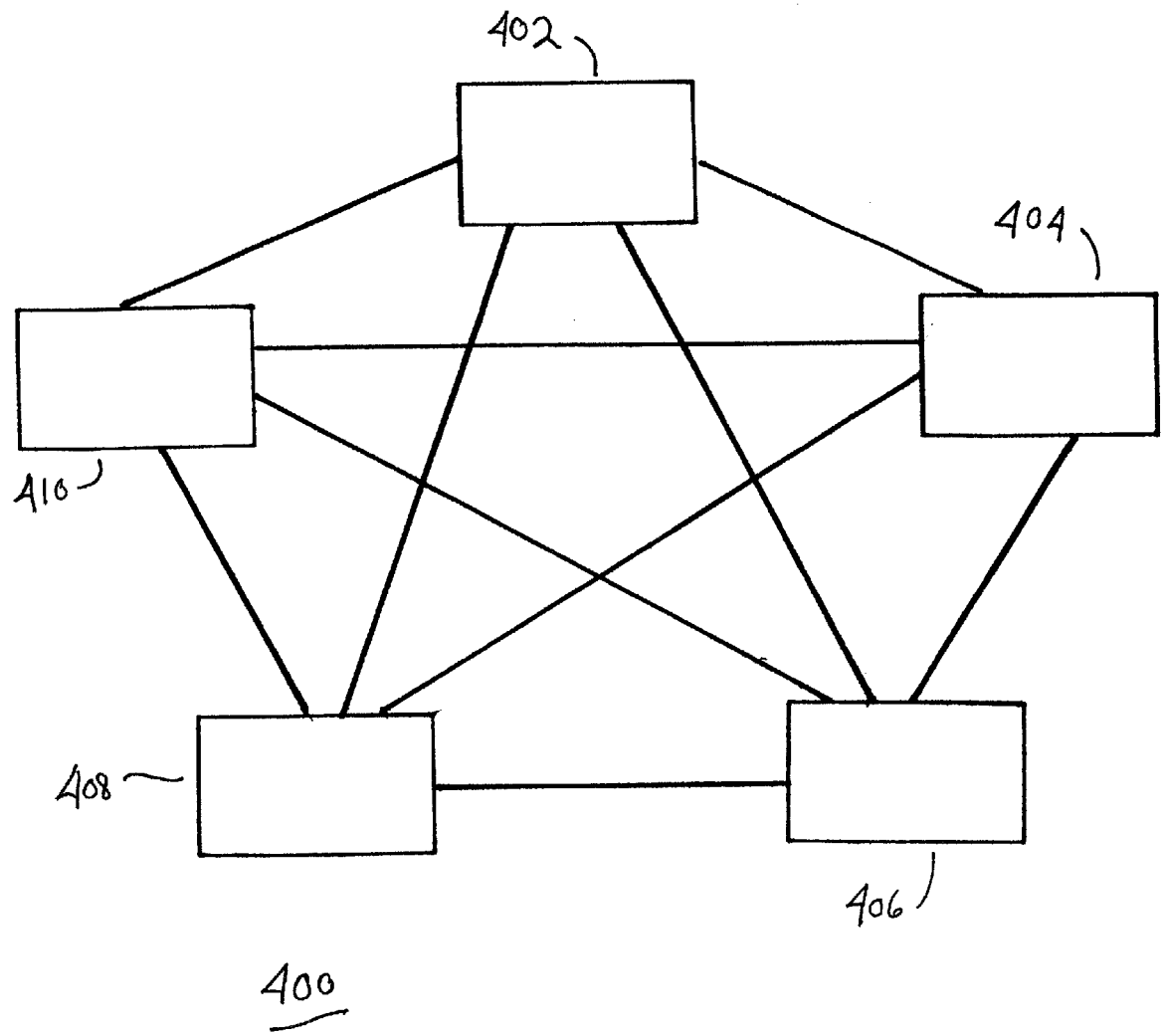
FIG. 10 shows a meshed network having a plurality of chassises such as the one FIG. 4.

Other configurations are possible, including a "star" configuration 350, as shown in FIG. 8 with a primary chassis 352 and secondary chassises 354, 356, 358, 360, 362, or a tiered arrangement 380, as shown in FIG. 9, with primary chassis 382 and secondary chassises 384 and 386 at the secondary layer and secondary chassises 388, 390, 392, 394 at the tertiary layer. A mesh configuration 400 is shown in FIG. 10 with chassises 402, 404, 406, 408, 410 where each chassis has in inter-chassis link to every other chassis. Primary and secondary chassises are determined by system configuration. Each chassis is substantially the same as every other chassis.

The above-described configurations can extend over tens of miles using long-haul fiber optic links, or may be collocated in a single rack at the-same master head end site.

Figure 11:
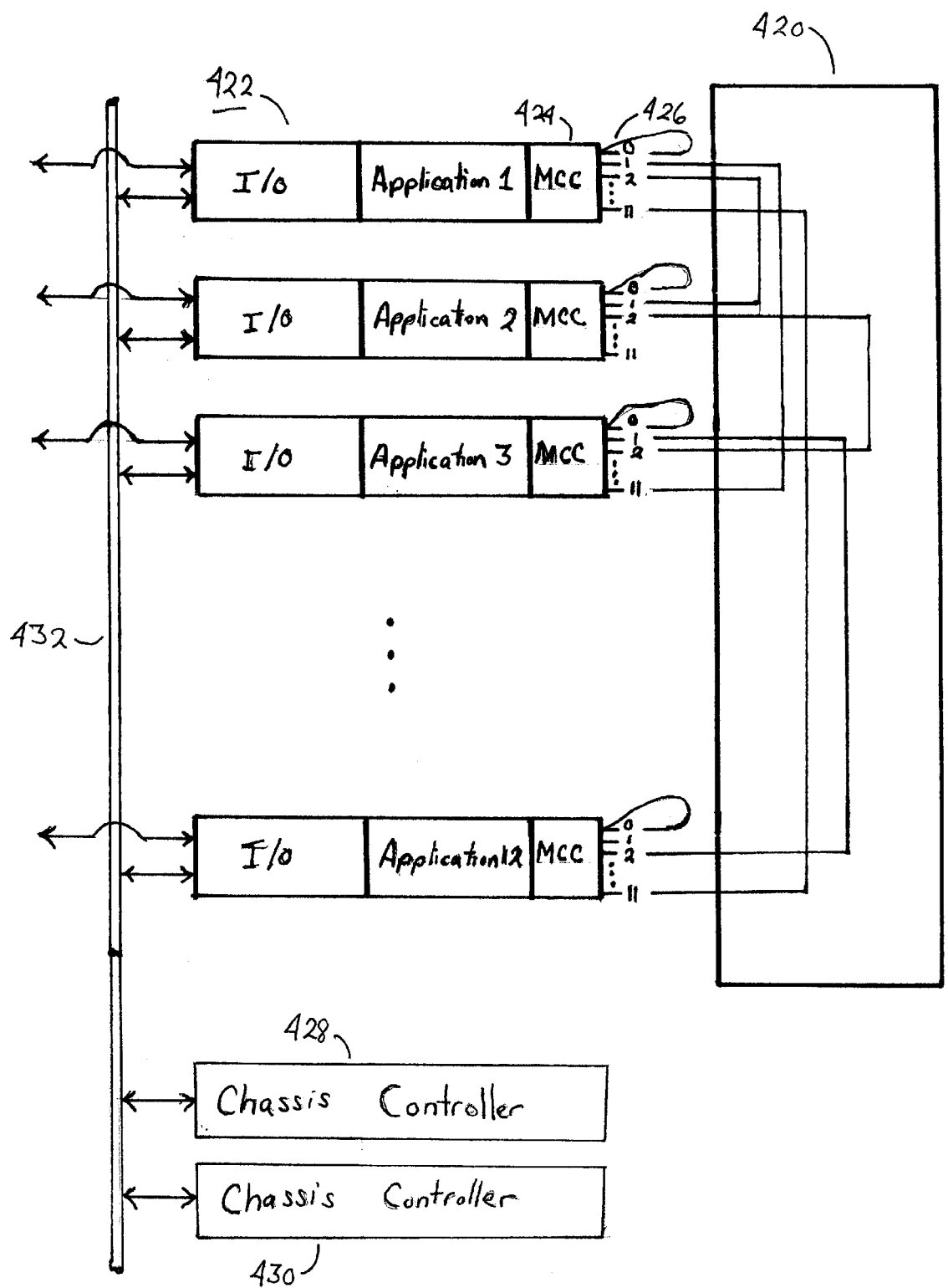
FIG. 11 is a block diagram of the application cards and backplane portions of the chassis of FIG. 4.

FIG. 11 shows application modules connected to a backplane 420 of the chassis 200 of FIG. 4. Each application module 422 interfaces with the backplane 420 through a Mesh Communication Chip (MCC) 424 that will be described more fully below. Each MCC 424 has twelve (12) serial link interfaces 426, eleven that run to the backplane 420. The eleven serial links that run to the backplane on each application module are for connecting the application module to every other application module in the chassis. One link is for connecting the module with itself, i.e., a loopback. The application modules 422 are connected to chassis controllers 428, 430 over a chassis management bus 432. The second chassis controller 430 is optionally used for redundancy in order to make the system more reliable. A second chassis management bus (not shown) is provided in a preferred embodiment also for redundancy/reliability purposes.

Figure 12:
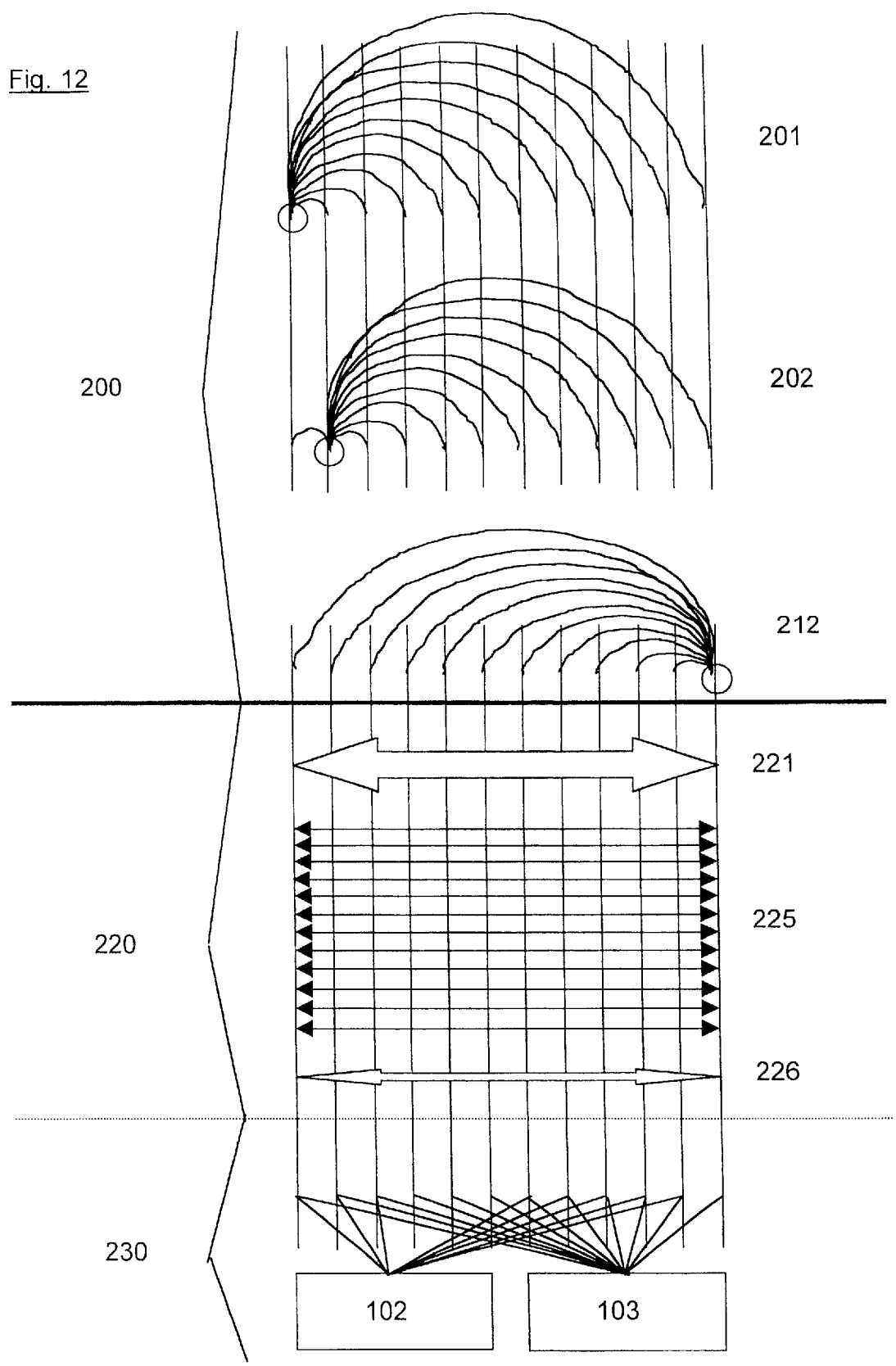
FIG. 12 is a schematic diagram of the backplane interconnections, including the switching mesh.

The backplane is fully meshed meaning that every application module has a direct point-to-point link to every other application module in the chassis through the serial links. The mesh threads in the mesh backplane each provide a continuous direct channel for communication of data at a rate of 1.5 gigabits per second or greater. Only a portion of the connections 200 are shown in FIG. 11 as an example. The backplane mesh is shown in FIG. 12.

The 12 channels with serial links of the MCC are numbered 0 to 11. The number is referred to as the channel ID or CID. Channels will be described more fully below. The slots on the backplane are also numbered from 0 to 11 (slot ID, or SID). The chassis system does not require, however, that a channel 0 be wired to a slot 0 on the backplane. A serial link may be connected to any slot. The slot IDs are dynamically configured depending on system topology. This allows for freedom in backplane wiring which reduces routing complexity.

Returning to FIG. 11, each application module is also connected to a chassis management bus 432 that provides the modules a connection to the chassis controllers.

Figure 13:
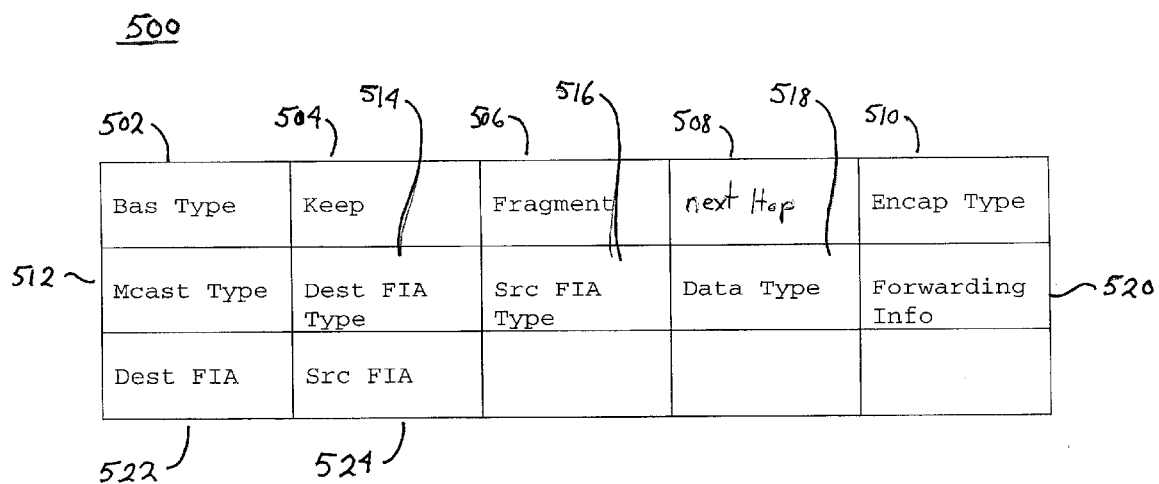
FIG. 13 is a block diagram of a BAS header according to principles of the present invention.

For switching packets between chassises over the inter-chassis links (ICLs) and for switching packets inside the chassises over the MCC links, the chassis has a inter-chassis switching layer. The inter-chassis switching layer lies below the IP layer 3 (L3, the network layer). Packet processing in the chassis is broken down into two types of traffic: unicast and broadcast/multicast. Switching through the inter-chassis switching layer is accomplished using the inter-chassis header 500 (also called the inter-chassis tag) shown in FIG. 13.

The Bas_Type field 502 has x bits and indicates the inter-chassis header type. This field may be used to indicate that the fabric interface address (FIA) has logical ports, to indicate whether the packet is a broadcast or unicast packet and to indicate relevant fields in the BAS header. The Bas_Type field 502 is for decoding the BAS header and to assist in packet forwarding.

The Keep field 504 has x bits and determines whether the packet may be dropped due to congestion.

The priority field has x bits (not shown in FIG. 13) and determines the packet priority and where to queue the packet due to congestion.

The fragment field 506 has x bits and indicates the packet fragmentation and whether the packet consists of two frames.

A next_Hop field 508 has a plurality of bits and is used for next hop information for intra-chassis packet transfer. This field is inactive unless the Bas_Type field indicates otherwise.

The Encap_Type field 510 is a one-bit field that indicates whether the packet needs further Layer 2 (data layer, below the inter-chassis switching layer) processing or whether the packet can be forwarded without further processing.

The Mcast_Type field 512 is a one-bit field that indicates whether the packet is broadcast or multicast.

The Dest_FIA_Type field 514 is a one-bit field that indicates whether the destination FIA is provided in short form (<chassis/slot/port>) or long form (<chassis/slot/port/logical port>).

The Src_FIA_Type field 516 is a one-bit field that indicates whether the source FIA field is provided in short form or long form.

The Data_Type field 518 has a plurality of bits and is used to indicate the type of traffic being carried in the payload.

The TTL field (not shown) has a plurality of bits and is a fail-safe mechanism to prevent packets from staying in the system indeterminately. The TTL is decremented each time it is received at an ICL port. If this field is zero after decrementing, the packet is discarded.

The Forwarding Info field 520 has a plurality of bits and contains the forwarding table revision, the forward_table_entry key/id, and the next hop information.

The Destination FIA field 522 has a plurality of bits and indicates the final destination of the packet. This field contains the chassis/slot/port and logical port information. A chassis value of zero has a special meaning, denoting the chassis with a Master Agent (to be described below). A port value of zero also has a special meaning, denoting that the receiver of the packet is an application module. The logical port may be used to indicate which stack/entity in the module is to receive the packet. All edge ports and ICL ports are therefore 1-based, i.e. the port numbers are greater than zero.

The Src FIA field 524 has a plurality of bits, and indicates the source of the packet. This field is used by a route server to identify the source of the incoming packets.

Figure 14:
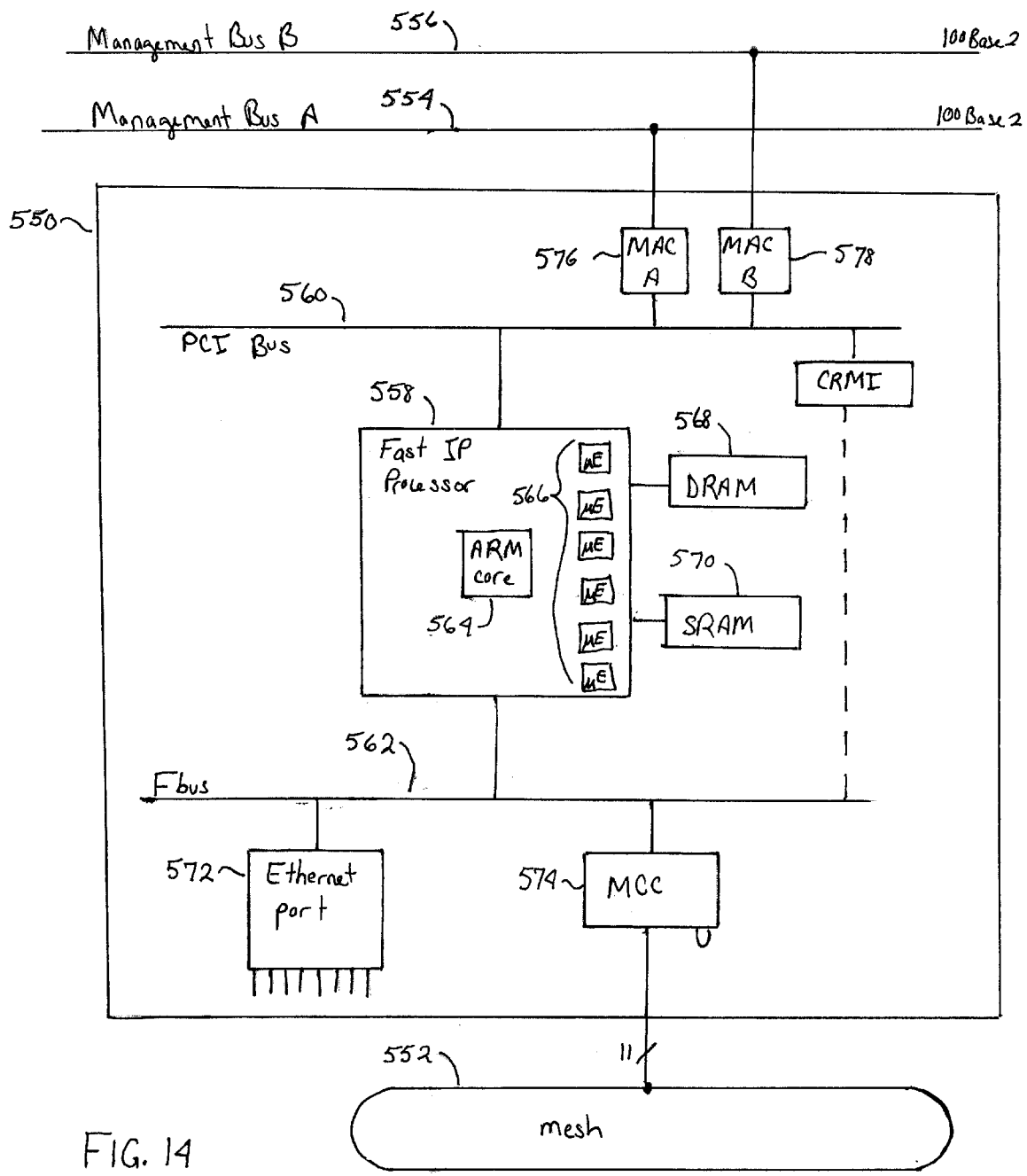
FIG. 14 is a block diagram of a Gigabit Ethernet inter-chassis link or egress application module.

According to the system architecture, all application cards that plug into the chassis share common features. The application cards are also called data processors, data processing application module, and data communication module. FIG. 14 is a block diagram of an Ethernet application module 550 in the chassis. The application module is connected to both the mesh backplane 552 and to the management busses A 554 and B 556. In the Ethernet application module 550, a fast IP processor (FIPP) 558 is connected to both a PCI bus 560 and an F-bus 562. The FIPP 558 has an Advanced RISC Machines (ARM) processor core 564 and six micro-engines 566. The FIPP 558 is connected to a DRAM 568 for storing packets and an SRAM 570 for storing a routing table. An Ethernet device 572 having 8 ports is connected to the F-bus 562. An MCC 574 is also connected to the F-bus. The MCC 574 provides the connections to the mesh backplane 552. The Ethernet device 572 provides connections to the outside of the chassis. Two MAC devices are connected between the PCI bus 560 and the management buses. MAC A 576 is connected between the PCI bus 560 and management bus A 554. MAC B 578 is connected between the PCI bus 560 and management bus B 556.

When a data packet comes into the Ethernet device 572, it goes through the FIPP 558 and is stored in the DRAM 568. The micro-engines 566 examine the data packets in parallel. The micro-engines 566 look at the IP address in the packet and then look up the destination address in the forwarding table stored in the SRAM 570. The forwarding table provides the chassis, slot and port that the packet will go out on. When the packet comes in over the Ethernet device, the packet has an Ethernet header. If the packet goes out the same slot through which it came, a inter-chassis header is not applied. The FIPP determines the sending port and sends the packet out that port. If the packet is to exit by a different slot, the Ethernet header is removed and a BAS header is added to the data packet. The minimum information in the BAS header is destination data, chassis, slot, and port information. The packet further includes an IP header and a payload. The FIPP has transmit queues where the packets are queued before transmission. The packets are sent over the F-bus 562 to the MCC 574 which sends data out in 64-byte chunks.

Figure 15:
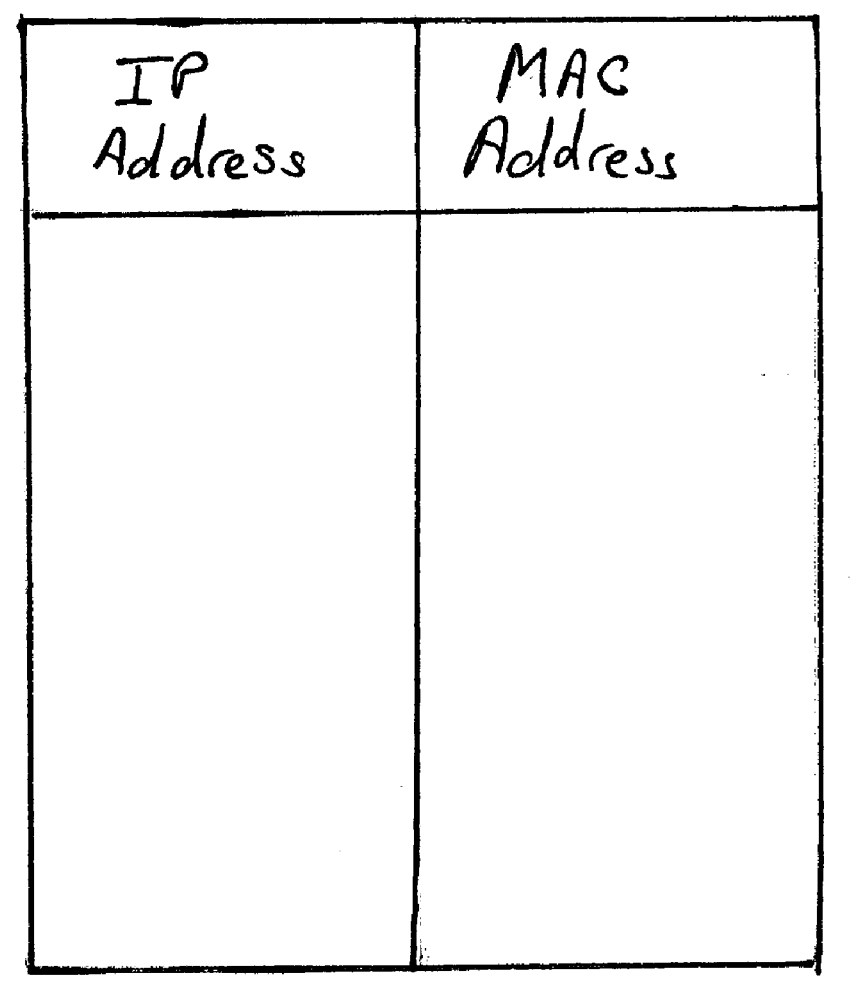

When a packet comes in through the MCC 574 of the Ethernet module 550, the application module 550 puts the packet, or pointers to the packet, into a queue in DRAM 570. If the packet is to go out one of the serial ports, the FIPP 558 looks up the destination in an ARP table in the SRAM 570. The ARP table is shown in FIG. 15. The FIPP finds the chassis, slot and port. The chassis address does not change unless the destination is an ICL. In the case of the same chassis, the application module finds the MCC address for the IP packet and sends it out. If the packet is to go to some other chassis, the application module asks if any port is an ICL. If it is, then the application module sends the packet out that port.

Figure 20:
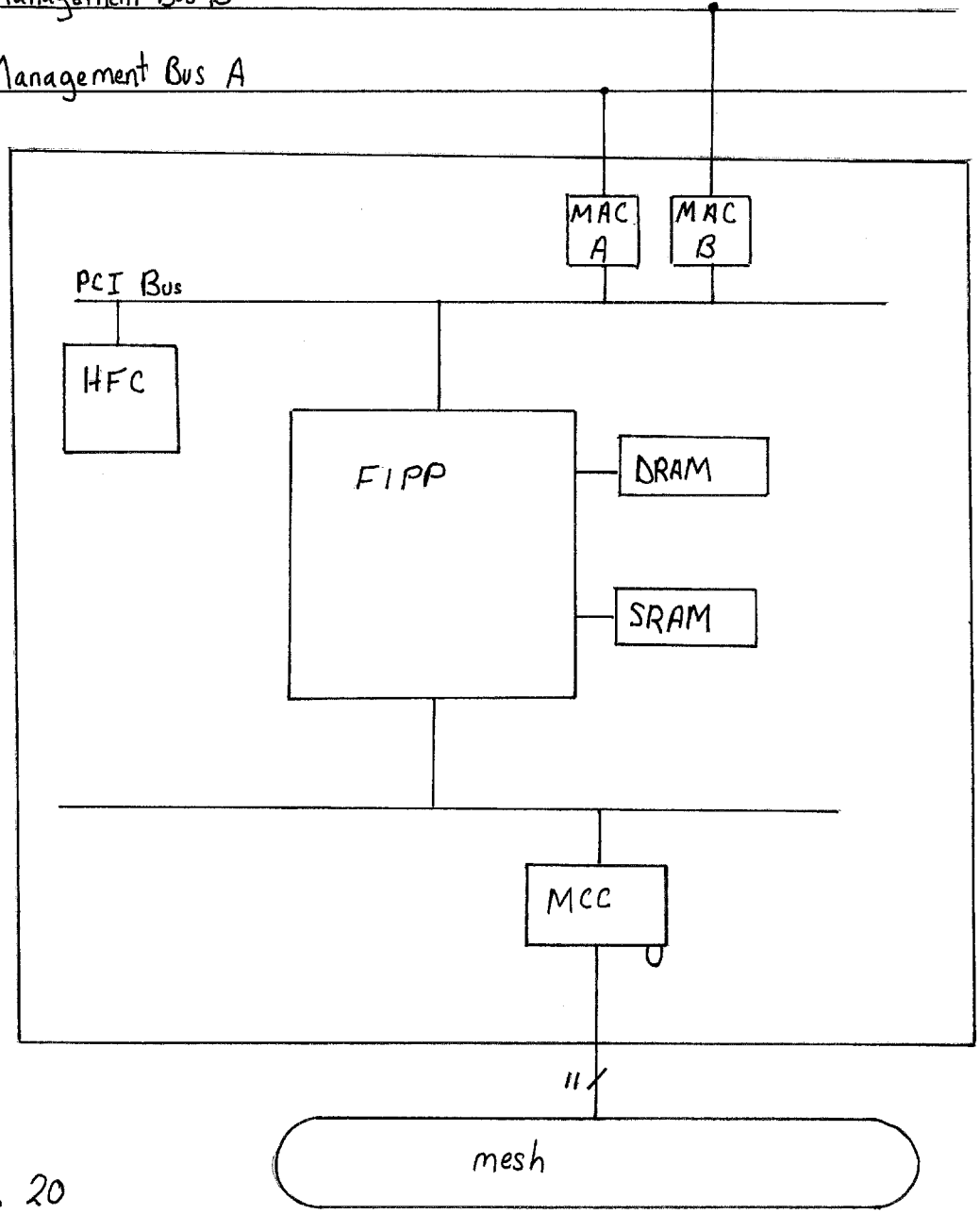
FIG. 20 is a block diagram of the CMTS application module.

FIG. 20 shows the CMTS application card, also referred to as a HFC DOCSIS Interface card. HFC-on-PCI technology is currently used because of currently available Broadcom technology, however, in the future other types of interface technology may be used.

Figure 16:
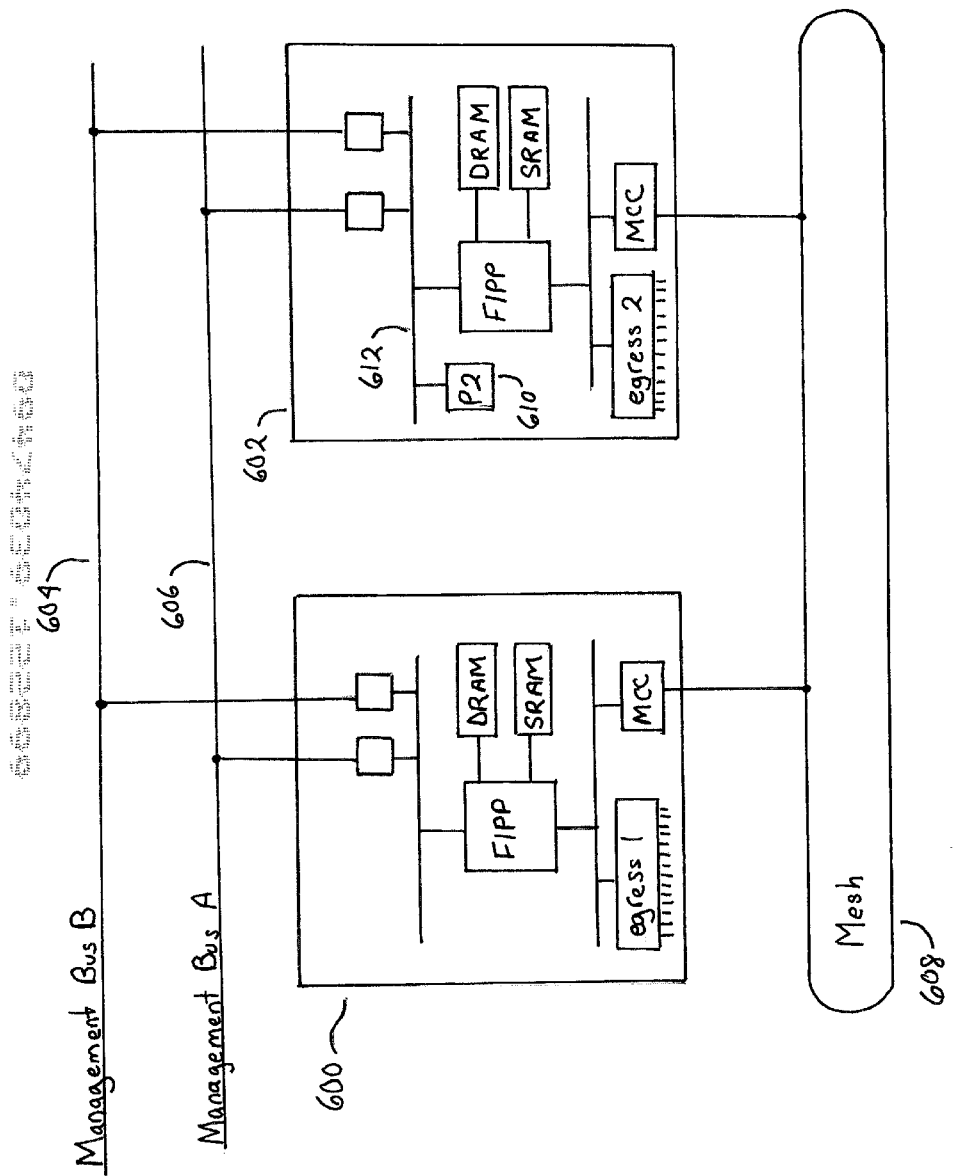
FIG. 16 is a block diagram of a two egress modules in a chassis.

FIG. 16 shows two application modules 600, 602 in a chassis. The application modules 600, 602 are connected over management busses 604, 606 and the mesh backplane 608. The second application module 602 has a route server 610 attached to the PCI bus 612. The route server for a chassis can reside on any application module. In the present embodiment of the invention, the route server is a Pentium® processor. Each chassis in a network of chassises has a route server. Only one route server in the network, however, may be active at any one time. The route server broadcasts over the management bus and also over the ICLs that it is a route server.

In a network of a plurality of chassises, one route server is designated to be the primary route server. All other route servers are secondary. The router servers in the network send out routing information every 30 seconds. The primary route server broadcasts its chassis, slot and port to all other route servers.

Figure 17:
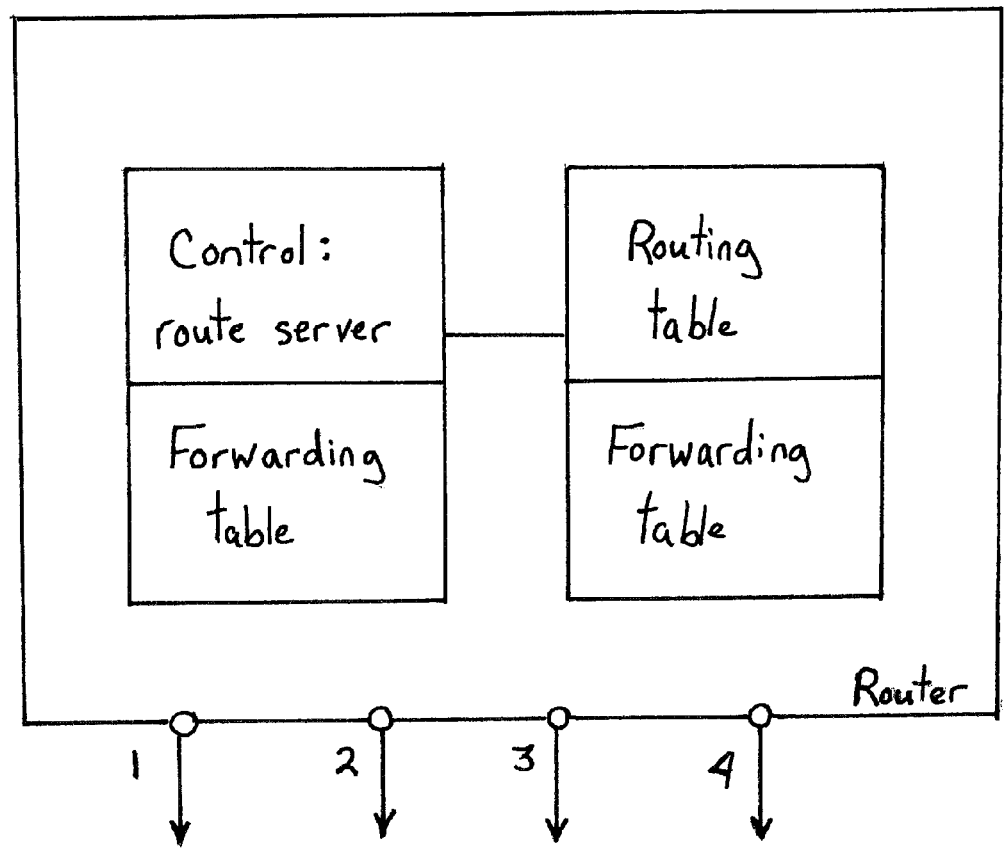
FIG. 17 is a block diagram of a route server.

FIG. 17 shows conceptually the updating of the route servers by the "control" or primary route server.

All forwarding tables know where the route server on their chassis is. The primary route server has logical ports equivalent to Ethernet ports.

When a packet is sent to a route server in one of the chassises networked together, the primary router receives the packet information as though the primary router was receiving the packet itself. The primary router builds a routing table and a forwarding table and broadcasts them out to all application modules and all other chassises on the network. The forwarding table is built from information in the routing table. The forwarding table contains such information as chassis, slot and port of a packet, QoS data, CMTS information, multicast domain information and next-hop ICL information.

Figure 18:
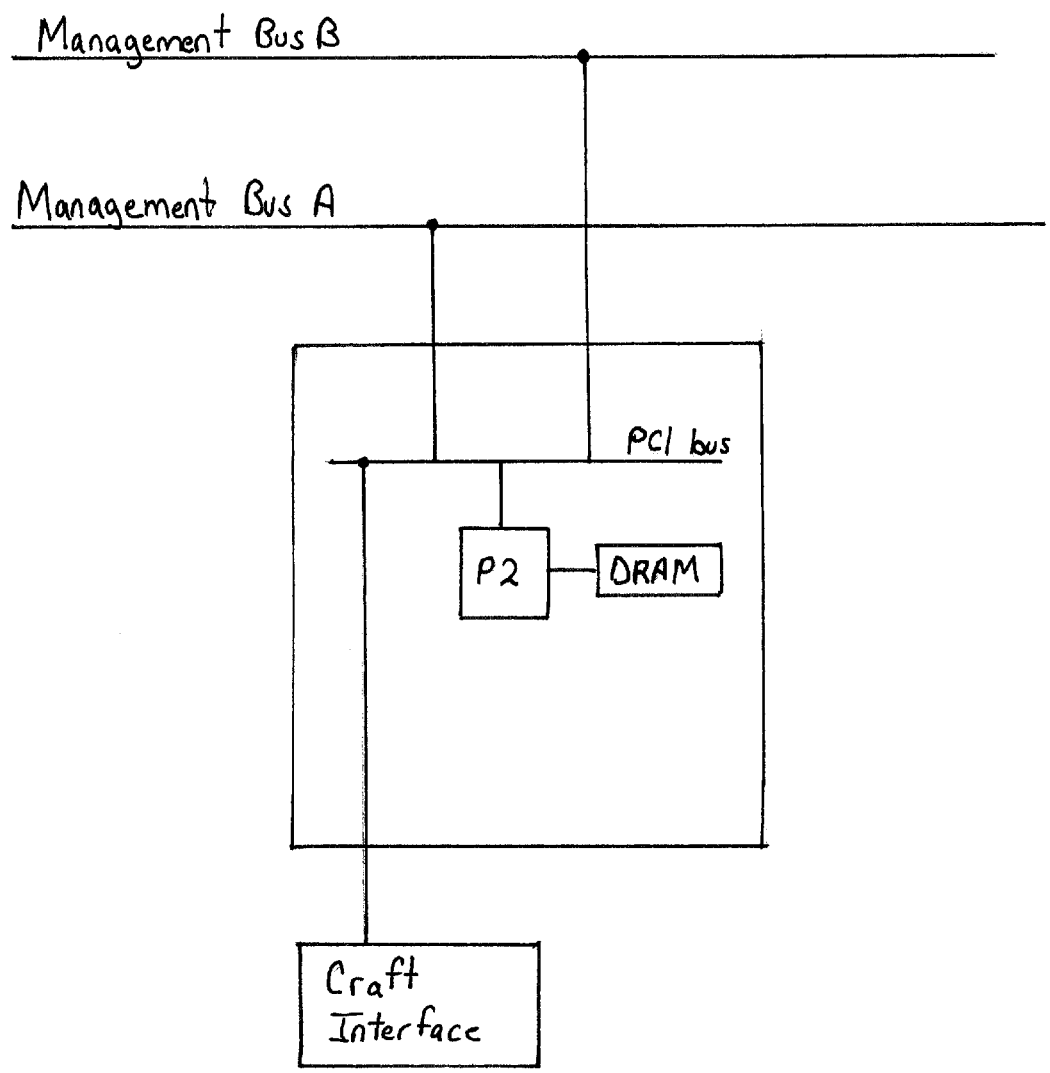
FIG. 18 is a block diagram of a chassis controller module.

FIG. 18 shows a chassis controller connected to the management busses in a chassis. For redundancy, each chassis has two chassis controllers. The chassis controller is not connected to the mesh backplane. The chassis controller has network management tasks and provisioning tasks. The chassis controller enables an entire chassis cluster to appear to be one managed element. The chassis controller has a processor and a memory and a craft interface. In the present embodiment of the invention, the processor is a Pentium® processor. The craft interface is a network management interface using 10/100 based Ethernet.

Logically, the clusters shown in FIGS. 8–10 collectively function as a single router, that is, an IP-Layer-3 switch, with a number of external ports. Physically these external ports would be distributed across multiple chassises, which may be distributed across remote locations. The ICLs "virtualize" the physical distribution of the external points.

Figure 19:
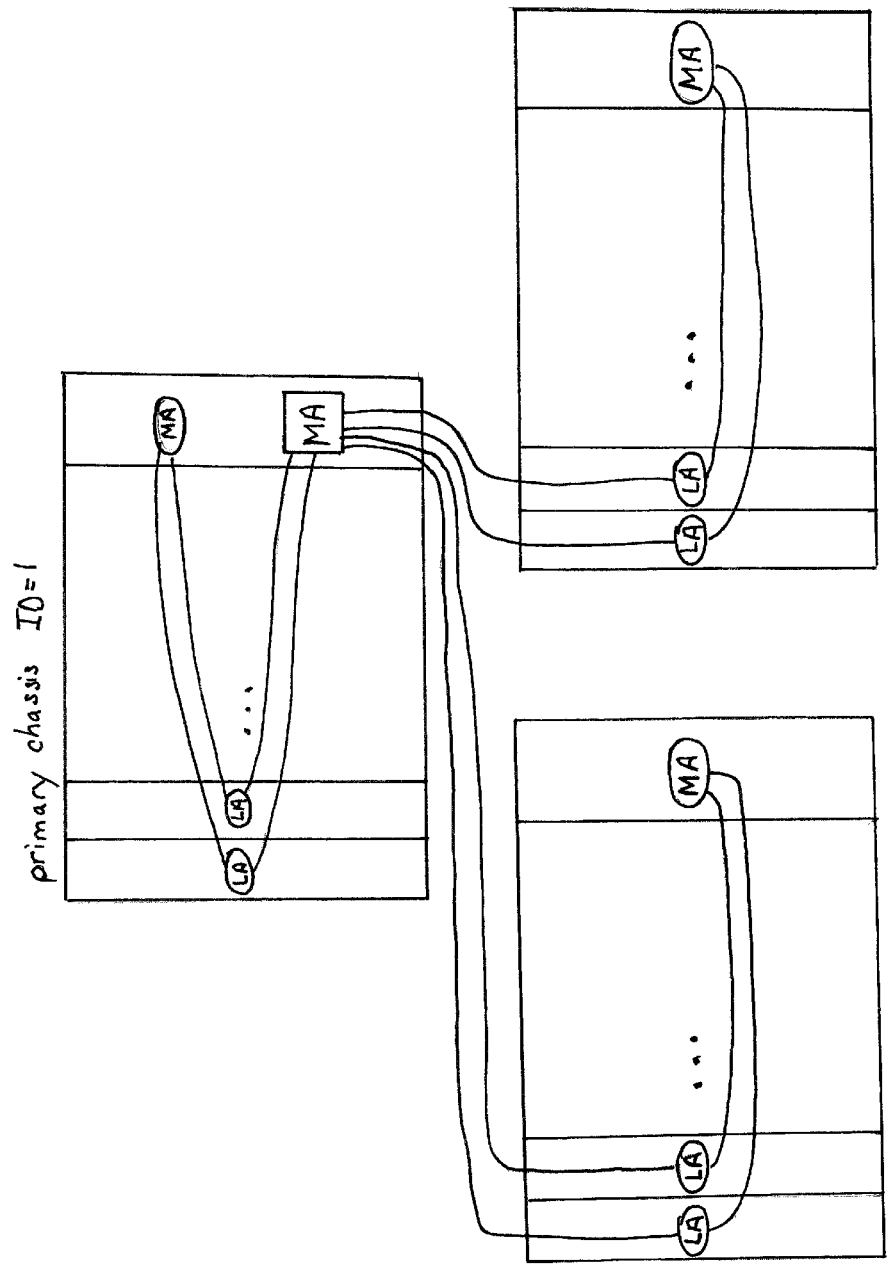
FIG. 19 is a block diagram of the network management architecture.

Logically the cluster is managed as a single entity (FIG. 19). From the view of IP, each card in every chassis would have a management subagent. The subagent local to each card would represent the card for management purposes. The cluster manager's management server (master agent) would communicate with the sub agents, again "virtualizing" the physical distribution of the subagents.

Both the primary and secondary chassises are capable of supporting various transmission media, focusing initially on HFC interfaces to support the connection of cable modems to provide Internet access and IP telephony. The chassises can support Telco-based return paths for some cable modem infrastructures, as well as regular (PSTN) modem-based Internet access.

The cluster manager 100 runs a general purpose operating system such as Windows NT. It is a set of more specific entities, including: (1) a Master Agent (MA) or network manager; (2) an application module; (3) a Resource Manager (RM) for providing a census of card resources; (4) a User Manager (UM) maintaining a dynamic view of IP end users served by the cluster; (5) a Forwarding Table Manager (FT) for creating/distributing the forwarding table; (6) a Filter Manager (FM) for generic IP filtering, (7) a Bandwidth (Quality of Service)/Class of Service Manager; and (8) a Load Sharing Manager (LS).

The System Management Server on the cluster manager also represents the clustered chassis as a single virtual entity. The cluster manager can also function as an RAS Server for dial-in modems. A RADIUS client on the cluster manager communicates with a RADIUS server provided by the network administrator.

General purpose functions like Web Server and Mail Server can be run on the cluster manager. FTP and Telnet allows the administrator to access the cluster manager remotely.

The invention allows resource sharing. For example, IP traffic coming into an HFC interface on a secondary chassis potentially has voice as its payload. This IP packet would be switched to a VOIP/PSTN card, which may be on a different chassis in a different location. The IP packet with the voice payload is routed to the appropriate VOIP/PSTN card by the distributed IP switch fabric. The originating chassis tags the packet with the highest "class of service" priority, allowing the route/switch decision to be performed with minimal latency. The cluster manager keeps a centralized resource map of all the resources (including the location of DSOs available) in the clustered system.

The chassis controller communicates with the application modules in the chassis over the management busses. The chassis controller and the application modules each have an agent for communication purposes. The chassis controller has a master agent and the application modules have subagents (FIG. 19). The subagents communicate their chassis, application module, and slot information to the master agent in that chassis.

FIG. 19 shows a plurality of chassises in a network. In a multi-chassis environment, the first chassis brought up is designated to be the primary chassis. The primary chassis has an additional master agent, referred to as the "master-master". All the chassises in the network communicate with the master-master agent. Each application module in every chassis communicates its IP address ("10.chassis.slot.port") to both the master agent for its chassis and the master-master as shown in FIG. 19. The number "10" in the IP address signifies a private network address.

The master-master agent distributes its chassis ID over the management bus. The chassis ID of the primary chassis shifts to one after the primary chassis is designated as the primary chassis. When a second chassis is brought up on the network, link detection protocol (LDP) is used to determine its presence. An LDP message is sent out every link of the current chassis. If the send chassis receives a return signal, the chassis controller identifies that as an ICL. The LDP enables each chassis to identify its ICL links. The primary chassis broadcasts over its ICL links that it has the master master agent.

Figure 21:
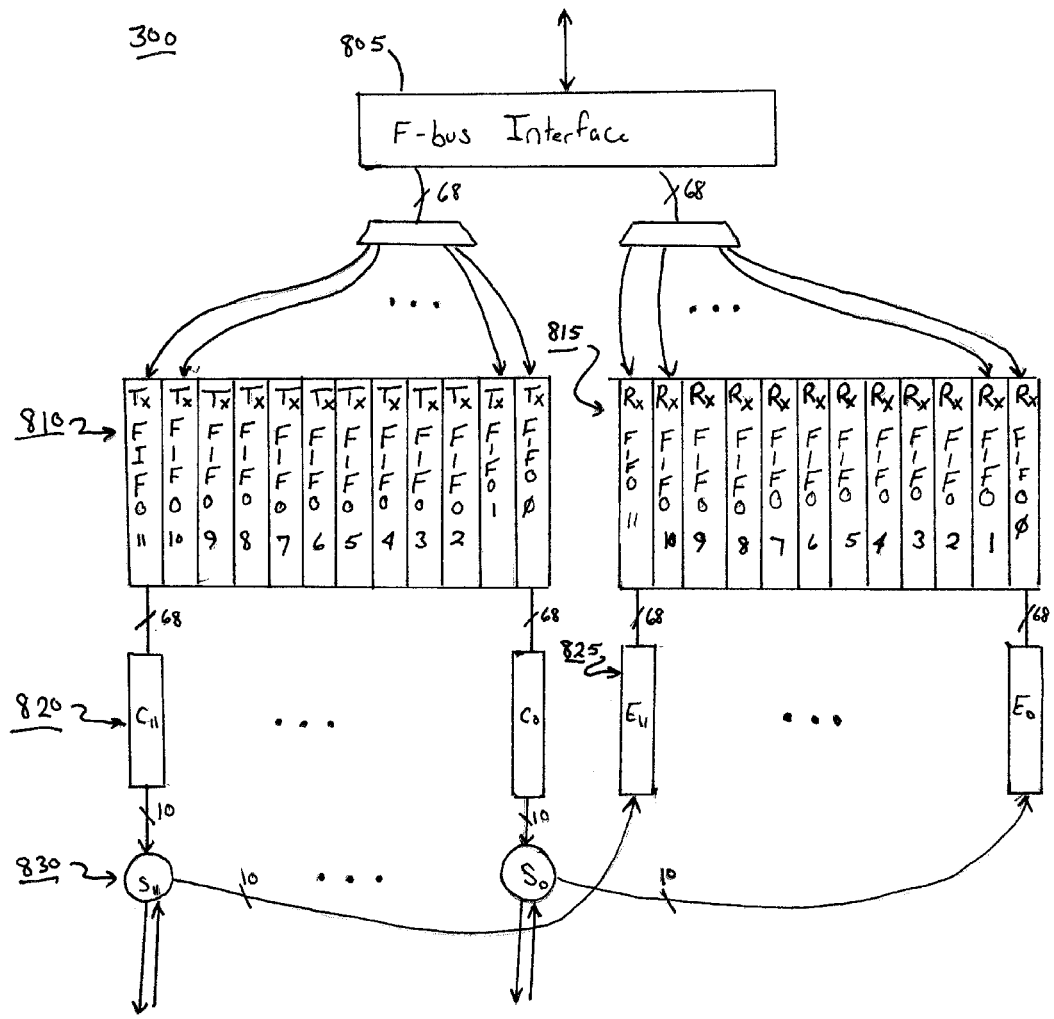
FIG. 21 is a block diagram of the backplane mesh interface.

FIG. 21 is a block diagram of the Mesh Communication Chip (MCC). The MCC ASIC provides connectivity to all other cards in the chassis via high speed differential pairs shown as fully duplexed serial links 215. Each differential pair operates at greater than one gigabit per second data throughput. An F-bus interface 805 connects the MCC 300 to the FIFO bus (F-bus). Twelve transmit FIFOs 810 and 12 receive FIFOs 815 are connected to the F-bus interface 805. Each transmit FIFO has a parallel to serial data compressor (12 data compressors in all, 820), and each receive FIFO has a data expander (12 data expanders in all, 825). Twelve serializers 830 serve the data compressors 820 and data expanders 825, one compressor and one expander for each serializer. A channel in the MCC is defined as a serial link together with its encoding/decoding logic, transmit queue and receive queue. The serial lines running from the channels connect to the backplane mesh. All the channels can transmit data at the same time.

A current implementation of the invention uses a Mesh Communication Chip to interconnect up to thirteen F-buses in a full mesh using serial link technology. Each MCC has two F-bus interfaces and twelve serial link interfaces. The MCC transmits and receives packets on the F-buses in programmable size increments from 64 bytes to entire packets. It contains twelve virtual transmit processors (VTPs) which take packets from the F-bus and send them out the serial links, allowing twelve outgoing packets simultaneously. The VTPs read the MCC tag on the front of the packet and dynamically bind themselves to the destination slot(s) indicated in the header.

The card/slot-specific processor, card/slot-specific MAC/PHY pair (Ethernet, SONET, HFC, etc.) and an MCC communicate on a bi-directional F-bus (or multiple unidirectional F-busses). The packet transmit path is from the PHY/MAC to the processor, then from the processor to the MCC and out the mesh. The processor does Layer 3 and Layer 4 look-ups in the FIPP to determine the packet's destination and Quality of Service (QoS), modifies the header as necessary, and prepends the MCC tag to the packet before sending it to the MCC.

The packet receive path is from the mesh to the MCC and on to the processor, then from the processor to the MAC/Phy and out the channel. The processor strips off the MCC tag before sending the packet on to the MAC.

Figure 22:
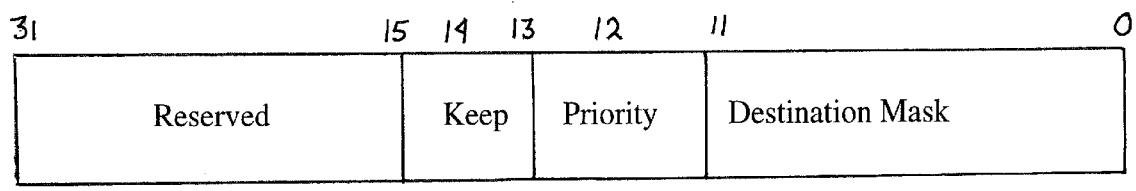
FIG. 22 is a block diagram of the MCC tag.

FIG. 22 shows a packet tag, also called the MCC tag. The MCC tag is a 32-bit tag used to route a packet through the backplane mesh. The tag is added to the front of the packet by the slot processor before sending it to the MCC. The tag has four fields: a destination mask field, a priority field, a keep field, and a reserved field. The destination mask field is the field holding the mask of slots in the current chassis to which the packet is destined, which may or may not be the final destination in the system. For a transmit packet, the MCC uses the destination mask to determine which transmit queue(s) the packet is destined for. For a receive packet the MCC uses the priority and keep fields to determine which packets to discard in an over-committed slot. The reserved field is unused in the current embodiment of the invention.

The MCC has two independent transmit mode selectors, slot-to-channel mapping and virtual transmit mode. In slot-to-channel mapping, the MCC transparently maps SIDs to CIDs and software does not have to keep track of the mapping. In virtual transmit mode, the MCC handles multicast packets semi-transparently. The MCC takes a single F-bus stream and directs it to multiple channels. The transmit ports in the MCC address virtual transmit processors (VTPs) rather than slots. The F-bus interface directs the packet to the selected virtual transmit processor. The VTP saves the Destination Mask field from the MCC tag and forwards the packet data (including the MCC tag) to the set of transmit queues indicated in the Destination Mask. All subsequent 64-byte "chunks" of the packet are sent by the slot processor using the same port ID, and so are directed to the same VTP. The VTP forwards chunks of the packet to the set of transmit queues indicated in the Destination Mask field saved from,the MCC tag. When a chunk arrives with the EOP bit set, the VTP clears its destination mask. If the next chunk addressed to that port is not the start of a new packet (i.e., with the SOP bit set), the VTP does not forward the chunk to any queue.

The MCC maintains a set of "channel busy" bits which it uses to prevent multiple VTPs from sending packets to the same CID simultaneously. This conflict prevention mechanism is not intended to assist the slot processor in management of busy channels, but rather to prevent complete corruption of packets in the event that the slot processor accidentally sends two packets to the same slot simultaneously. When the VTPs get a new packet, they compare the destination CID mask with the channel busy bits. If any channel is busy, it is removed from the destination mask and an error is recorded for that CID. The VTP then sets all the busy bits for all remaining destination channels and transmits the packet. When the VTP sees EOP on the F-bus for the packet, it clears the channel busy bits for its destination CIDs.

The F-bus interface performs the I/O functions between the MCC and the remaining portion of the application module. The application module adds a 32-bit packet tag (MCC tag), shown in FIG. 22, to each data packet to be routed through the mesh.

The data received or transmitted on the F-bus is up to 64 bits wide. In data transmission, the F-bus interface adds 4 status bits to the transmit data to make a 68-bit data segment. The F-bus interface drops the 68-bit data segment into the appropriate transmit FIFO as determined from the packet tag. The data from a transmit FIFO is transferred to the associated data compressor where the 68-bit data segment is reduced to 10-bit segments. The data is then passed to the associated serializer where the data is further reduced to a serial stream. The serial stream is sent out the serial link to the backplane.

Data arriving from the backplane comes through a serial link to the associated channel. The serializer for that channel expands the data to a 10-bit data segment and the associated data expander expands the data to a 68-bit data segment, which is passed on to the related FIFO and then from the FIFO to the F-bus interface.

A Fast IP Processor (FIPP) is provided with 32/64 Mbytes of high-speed synchronous SDRAM, 8 Mbytes of high-speed synchronous SRAM, and boot flash. The FIPP has a 32-bit PCI bus and a 64-bit FIFO bus (F-bus). The FIPP transfers packet data to and from all F-bus-connected devices. It provides IP forwarding in both unicast and multicast mode. Routing tables are received over the management bus from the chassis route server. The FIPP also provides higher layer functions such as filtering, and CoS/QoS.

Each line card has a clock subsystem that produces all the clocks necessary for each card. This will lock to the reference clock provided by the System Clock and Management Bus Arbitration Card.

Each card has hot-plug, power-on reset circuitry, and Sanity Timer functions. All cards have on-board DC-to-DC converters to go from the −48V rail in the backplane to whatever voltages are required for the application. Some cards (such as the CMTS card) likely will have two separate and isolated supplies to maximize the performance of the analog portions of the card.

The above discussion describes the preferred embodiment of the invention(s) at the time of filing. It should be clear that equivalent components and functions may be substituted without departing from the substance of the invention(s). Various mixes of hardware and software implementation are possible while retaining the benefits of the invention(s). Because the invention is intended to be highly flexible and scalable, it is the cooperation of the modules here disclosed that is important, rather than the number of modules and ports.

What is claimed is:

1. Apparatus for connecting data distribution sub-networks, said apparatus comprising:
   (a) at least one chassis with multiple identical interfaces to a mesh having mesh threads providing a continuous direct channel for communication of data between each pair of said interfaces;
   (b) at least one data processing module with at least one data port adapted for connecting to data distribution sub-networks, said module engaging one of said interfaces of said chassis and responsive to information in data received through one of said ports to route said data to selected ones of said mesh threads to which said module is interfaced; and
   (c) a process controller module logically connected to said data processor module.

2. The apparatus of claim 1 wherein said routing of said data is determined by a tag appended to said data indicating one or more destination interfaces selected among said identical interfaces.

3. The apparatus of claim 1 further comprising;
   (c) at least one inter-chassis data link;
   (d) at least one secondary chassis identical to the chassis recited in claim 1; and
   (e) at least one data processing module with at least one data port adapted for connecting to data distribution sub-networks, said module engaging one of said interfaces of said secondary chassis and responsive to information in data received from said inter-chassis data link to route said data to a selected data distribution port.

4. The apparatus of claim 3 wherein said inter-chassis data link comprises:
   (c1) a data processing module with at least one data port adapted for connecting to an inter-chassis data link medium, said module engaging one of said interfaces of said primary chassis and responsive to information in data received through said interface to route said data to said inter-chassis data port;
   (c2) an inter-chassis data link medium connected at one end to said inter-chassis data port; and
   (c3) a data processing module with at least one data port adapted for connecting to an inter-chassis data link medium and connected to the other end of said inter-chassis data link medium, said module engaging one of said interfaces of said secondary chassis and responsive to information in data received through said inter-chassis data port to route said data to one of said mesh channels to which said module is interfaced.

5. The apparatus of claim 3 further comprising a process controller module logically connected to each data processing module.

6. The apparatus of claim 5 wherein said process controller module is logically connected through said inter-chassis data link to a data processing module engaging said secondary chassis module.

7. Apparatus for connecting data distribution sub-networks, said apparatus comprising:
   (a) at least two chassises each containing at least one processor providing a route server; and
   (b) an inter-chassis link;
   wherein said chassises provide ports to said data distribution sub-networks and one said route server acts as a master route server and communicates with each other route server such that said chassises act as a single Layer 3 switch.

8. The apparatus of claim 7 wherein data received through one of said ports in any one of said chassises is assigned a switch-internal tag to specify an appropriate one of said ports for forwarding to a destination in said data distribution sub-network.

9. The apparatus of claim 7 wherein said master route server provides routing tables for each other route server.

10. The apparatus of claim 7 wherein at least one of said chassises comprises multiple processors each switchably connected to one another and each providing one or more of said ports and each logically connected to said inter-chassis link.

11. The apparatus of claim 10 wherein data received through one of said ports of, or said inter-chassis link to, said multiple processor chassis is assigned an chassis-internal tag to specify an appropriate one of said ports of, or said inter-chassis link to, said multiple processor chassis for forwarding.

12. A chassis having multiple identical slots for holding data processing application modules, each slot having identical interfaces to a back-plane mesh having mesh threads each providing a continuous direct channel for communication of data between each pair of said interfaces, said mesh threads capable of throughput commensurate with communication of digital data packets at a rate of 1.5 gigabits per second or greater.

13. The chassis of claim 12 further comprising a management control signal bus and wherein said identical interfaces interface with said bus.

14. The chassis of claim 12 further comprising a telecommunication bus.

15. The chassis of claim 12 providing connection to external data ports for said modules at the back-plane side of said chassis.

16. The chassis of claim 12 further comprising a fully distributed DC power supply for said modules.

17. The chassis of claim 12 wherein the number of said identical slots is greater than four.

18. A data processing application module with at least one data port adapted for connecting to data distribution sub-networks, said module further adapted for insertion into a slot in a chassis and thereby engaging an interface associated with said slot, wherein said interface includes multiple channels each capable of communication of digital data packets at a rate of 1.5 gigabits per second or greater, and wherein said module is responsive to information in data received through said data port to route said data to selected ones of said multiple channels.

19. The module of claim 18 wherein said routing of said data is determined by a tag appended by said module to said data indicating one or more slot-interfaces in said chassis to which said data ultimately is to be routed, said module capable of selecting an alternate route if a first route fails and of rerouting received data having an appended tag indicating an ultimate slot-interface other than that of said module.

20. The module of claim 18 wherein said module responds to said received data examined in parallel blocks and transmits said data serially on said channel.

21. The module of claim 18 wherein said module comprises a separate transceiver dedicated to each said channel.

22. A data processing application module with at least one data port adapted for connecting to data distribution sub-networks, said module having a route server adapted for synchronization with a master route server such that said module combined with another module can act as a single Layer 3 switch.

23. The module of claim 22 wherein data received through one of said data ports is assigned a switch-internal tag to specify an appropriate port for forwarding to a destination data distribution sub-network.

24. The module of claim 22 adapted for mounting in a single chassis with substantially identical data processing modules wherein data received through one of said data ports is assigned an chassis-internal tag to specify an appropriate ports for forwarding to a destination data distribution sub-network.

25. A process for connecting users on data distribution sub-networks, each connected to a data processing application module installed in one or more chassises, said process comprising:
A) receiving data on a module installed in a chassis and connected to one data distribution sub-network;
B) determining from header information in said received data whether the destination of said received data is on a data distribution sub-network i) connected to a module installed in said chassis, ii) connected to a module installed in another chassis with an inter-chassis data link to said chassis, or iii) connected on the Internet or similar network accessible through a module on said chassis or another chassis with an inter-chassis data link to said chassis;
C) appending a header-tag to said received data to route said data within said chassis; and
D) transmitting said data without said header-tag from a module installed in said chassis;
c) forwarding said data to said port designated by said tag.

26. A process for switching data flow among data communication modules interconnected within a chassis, said process comprising the steps of:
A) receiving said data at one said module;
B) applying said data m bits at a time an m-bit-wide parallel bus in said module;
C) storing said data in m-bit parallel queues;
D) determining which module is the appropriate destination module;
E) appending a tag to said data to indicate to which destination module said data is to be routed;
F) applying said data m bits at a time to said m-bit-wide parallel bus;
G) gating said m bits of data into an intra-chassis channel associated with a path to said destination module;
H) serializing said m bits to data;
I) applying said serialized m bits of data to a high-speed serial link dedicated to said channel associated with said path;
J) applying said data m bits at a time to an m-bit-wide parallel bus in said destination module;
K) storing said data in m-bit parallel queues;
L) applying said data m bits at a time to said m-bit-wide parallel bus in said destination module; and
M) transmitting said data from said destination module.

27. A process for connecting data distribution sub-networks ported to multiple chassises, said process comprising:
a) synchronizing route servers for each of said multiple chassises;
b) appending a tag to data received at a port of one of said chassises designating a port for forwarding according to information in said data and the synchronized route server for said chassis; and
c) forwarding said data to said port designated by said tag.

28. Apparatus for connecting users on data distribution sub-networks comprising a data processing application module adapted for installation in a chassis and to be logically connected to one or more substantially similar modules installed in the same or other chassis, said module comprising:
A) means for receiving data;
B) means for determining from header information in said received data whether the destination of said received data is on a data distribution sub-network i) connected to a module installed in said chassis, ii) connected to a module installed in another chassis with an inter-chassis data link to said chassis, or iii) connected on the Internet or similar network accessible through a module on said chassis or another chassis with an inter-chassis data link to said chassis;
C) means for appending a header-tag to said received data to route said data within said chassis; and
D) means for transmitting said data without said header-tag from a module installed in said chassis.

29. Apparatus comprising a data communication module for switching data flow among substantially similar modules interconnected within a chassis, said module comprising:
A) means for receiving said data;
B) means for applying said data m bits at a time to an m-bit-wide parallel bus;
C) means for storing said data in m-bit parallel queues;
D) means for determining which module is the appropriate destination module;
E) means for appending a tag to said data to indicate to which destination module said data is to be routed;
F) means for applying said data m bits at a time to said m-bit-wide parallel bus;
G) means for gating said m bits of data into an intra-chassis channel associated with a path to said destination module;

H) means for serializing said m bits of data; and

I) means for applying said serialized m bits of data to a high-speed serial link dedicated to said channel associated with said path.

30. Apparatus for connecting data distribution sub-networks ported to multiple chassises, said apparatus comprising;

a) at least one data processor installed in each of said chassises;

b) at least one route server at each of said chassises;

c) means for synchronizing each of said route servers;

d) means for appending a tag to data received at a port of one of said chassises designating an port for forwarding according to information in said data and the synchronized route server for said chassis; and e) means for forwarding said data to said port designated by said tag.

* * * * *